(12) United States Patent  (10) Patent No.: US 7,976,327 B2
Matsumoto et al.  (45) Date of Patent: Jul. 12, 2011

(54) CARD CONNECTOR FOR RECEIVING MULTIPLE CARDS

(75) Inventors: Yasuyoshi Matsumoto, Yamato (JP); Mitsuhiro Tomita, Yamato (JP); Jun Matsukawa, Yamato (JP); Kazuo Matsukawa, legal representative, Fukushima (JP); Yuji Naito, Yamato (JP)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 12/739,874

(22) PCT Filed: Oct. 27, 2008

(86) PCT No.: PCT/US2008/012162
§ 371 (c)(1),
(2), (4) Date: Aug. 27, 2010

(87) PCT Pub. No.: WO2009/055062
PCT Pub. Date: Apr. 30, 2009

(65) Prior Publication Data
US 2011/0008985 A1 Jan. 13, 2011

(30) Foreign Application Priority Data
Oct. 26, 2007 (JP) .................................. 2007-278765

(51) Int. Cl.
*H01R 13/62* (2006.01)

(52) U.S. Cl. ...................................................... 439/326
(58) Field of Classification Search .................. 439/326, 439/630, 331
See application file for complete search history.

(56) References Cited

U.S. PATENT DOCUMENTS

| 6,471,550 B2* | 10/2002 | Maiterth et al. | 439/631 |
| 2008/0124964 A1* | 5/2008 | Chen | 439/326 |
| 2008/0200057 A1* | 8/2008 | Ming et al. | 439/326 |

* cited by examiner

*Primary Examiner* — Phuong K Dinh
(74) *Attorney, Agent, or Firm* — Timothy M. Morella

(57) ABSTRACT

A card connector is adapted to receive first and second electronic cards, each having a plurality of contact pads. The second card being wider than the first card. The connector includes an insulative housing with a plurality of first and second terminals mounted therein for engaging respective ones of the contact pads of the electronic cards when the cards are inserted into the connector. A cover member is pivotally mounted on the housing to permit movement of the cover member between an open position at which one of said first and second electronic cards may be inserted and a closed position at which the electronic card inserted into the cover is operatively positioned within the connector. The cover member has first and second sets of positioning members configured to position and hold electronic cards exclusively at the desired location for such card and wherein some of the positioning members of the first set also act as positioning members of the second set.

9 Claims, 29 Drawing Sheets

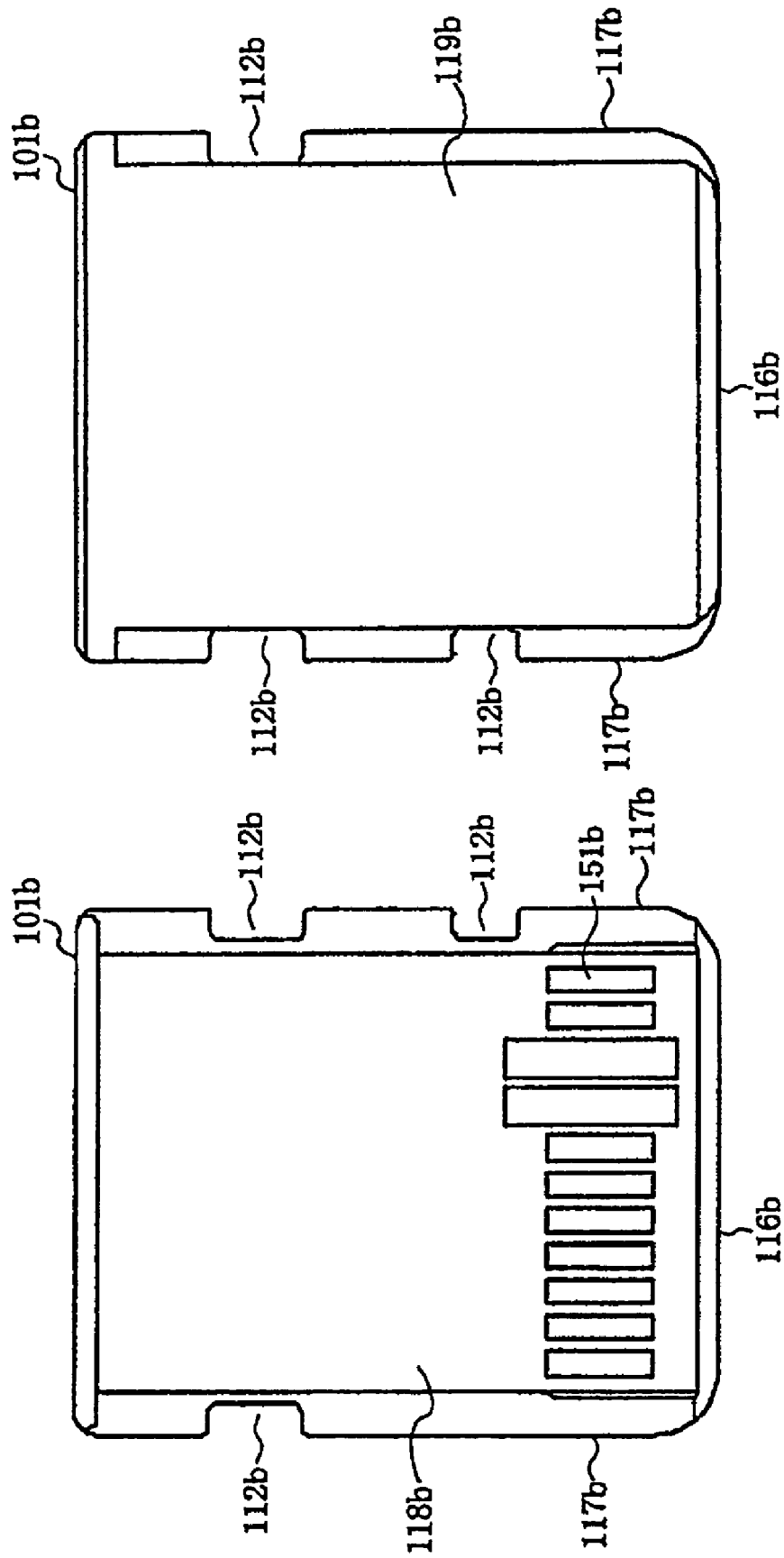

CARD CONNECTOR FOR RECEIVING MULTIPLE CARDS

BACKGROUND OF THE INVENTION

The present invention relates generally to a card connector and more specifically to a card connector that may receive any of multiple sized cards.

Conventionally, an electronic device such as a personal computer, a cellular phone, a PDA (personal digital assistant), a digital camera, a video camera, a music player, a game machine, a vehicle navigation device, and so on is provided with a card connector because of the fact that such an electronic device uses various types of memory cards such as a SIM (subscriber identity module) card, a MMC®(Multiple Media Card), a SD® (Secure Digital) card, a mini SD® card, Memory Stick®, Smart Media®, and so forth.

In recent years, as the types of electronic devices have been diversified, memory cards are also showing a tendency of diversification. Therefore, a card connector in which not only one but two different types of memory cards can be mounted is proposed (For example, see Japanese Patent Application Laid-Open (Kokai) publication No. 2003-132976).

FIG. 29 is a perspective view illustrating an example of a conventional card connector in which reference numeral 811 designates a housing of the card connector, and reference numeral 861 denotes a holder member, which holds a first card 901 and a second card 902 and is pivotally connected to the housing 811. The first card 901 and the second card 902 are different in not only size but also locations of a first cut-away portion 911 and a second cut-away portion 912 and the numbers and arrays of first connecting pads 951 and second connecting pads 952.

Therefore, in the holder member 861, a first accommodating portion 871 for accommodating the first card 901 and a second accommodating portion 872 for accommodating the second card 902 are formed respectively. In addition, the holder member 861 is provided with insertion guides 862 for allowing the first card 901 and the second card 902 to be inserted, pivotal shafts 863 pivotally attached to the housing 811, and pivotal motion actuating arms 864 for causing a pivotal motion of the holder member 861.

Further, the housing 811 is provided with a plurality of first window opening portions 821 and a plurality second window opening portions 822 formed in a substrate portion 812 thereof. Furthermore, a first terminal 851, which comes into contact with each of the first connecting pads 951 of the first card 901, is accommodated in each of the first window opening portions 821, and a second terminal 852, which comes into contact with each of the second connecting pads 952 of the second card 902, is accommodated in each of the second window opening portions 822. The housing 811 is moreover provided with bearing portions 813 in which the pivotal shafts 863 are pivotally supported, arm fixing portions 814 for holding the pivotal motion actuating arms 864, and an accommodating recess portion 815.

Therefore, the first card 901 and the second card 902 having different sizes can be mounted simultaneously as if they are superimposed on one another.

Nevertheless, in the conventional card connector described above, since the first card 901 and the second card 902 having different sizes, shapes, and so forth, are superimposed on each other and mounted, dimensions of the housing 811 and the holder portion 861 in a thickness direction must become lager, which in turn increases the overall size of the connector and makes it difficult to attach the connector to a small-sized electronic device. However, in an ordinary stage of use of an electronic device, it is not required to mount two cards at the same time, and it is instead required to be able to selectively mount any one of a plurality of types of cards having different sizes, shapes, connecting pad arrays, and so forth.

Moreover, although a function for preventing a card from being mounted in a location provided for a different type of card, in other words, a function for preventing erroneous mounting, is also required, it is particularly possible in the above-mentioned conventional card connector that one may mount the small-sized first card 901 to a location where the large-sized second card 902 should be mounted.

SUMMARY OF THE INVENTION

It is an object of the invention to solve the problems encountered by the conventional card connector, and to provide a card connector which allows a positioning member provided for a cover member to discriminate a type of a card, so that the card connector can be small in its size with a minute thickness dimension, and that discrimination of a plurality of types of cards can be surely achieved, while unexceptionally avoiding mounting of a card on a wrong position or at a wrong attitude and ensuring that each of the plurality of types of cards is exclusively mounted in position.

Therefore, a card connector according to the present invention comprises a housing provided with a plurality of terminal members arrayed along one end edge on one of surfaces thereof, and cavity portions accommodating a plurality of types of cards having different widths, a plurality of types of connecting terminals which are attached to the housing and are capable of coming into contact with the terminal members of the respective types of cards, and a cover member configured to have one end thereof pivotally attached to the housing, and to cover the housing and an upper part of at least a part of each of the cards accommodated in the housing, wherein the cover member is provided with positioning members which are configured to perform positioning and holding of each of the cards exclusively at a given location for each type of card, and the cards are adapted for being positioned and held by the cover member which is located at an opened position thereof, and being accommodated in the cavity portions, when the cover member is brought to a closed position thereof from the opened position thereof.

In the card connector according to another embodiment of the present invention, the given location of each type of card is set so that the given location for a card having the smallest width is arranged to be closest to one end of the cover member, and the given location for a card having a larger width is arranged to be closer to the other end of the cover member.

In the card connector according to a further embodiment of the present invention, the positioning members include side face positioning members, which are arranged to correspond to every width of the cards of respective types to perform positioning of the respective cards in the width direction thereof.

In the card connector according to a still further embodiment of the present invention, the side face positioning members are respectively provided such that each of the side face positioning members includes a portion to be engaged with a side face portion of one of the cards and anther portion to be engaged with one of surfaces of the said one of the cards.

In the card connector according to a still further embodiment of the present invention, the side face positioning members are further provided such that each of the side face positioning members comprises positioning members configured to form a pair and disposed at positions corresponding to left and right opposite sides of one of the cards, and that a distance between the positing members on left and right sides corresponding to "n"th type of card is larger than a width of "n−1"th type of card and smaller than a width of "n+1"th type of card, where "n" represents a natural number.

In the card connector according to a still further embodiment of the present invention, the side face positioning member having the positioning members corresponding to the "n"th type of card comes into contact with a front end face of the "n+1" type of card to thereby perform positioning of the said latter card in a front and rear direction thereof.

In the card connector according to a still further embodiment of the present invention, the side face positioning members having the respective paired positioning members are further provided in such a manner that respective ones of the respective paired positioning members disposed at positions corresponding to either left or right side of the cards are arrayed along a straight line extending in the front and rear direction of the cover member.

In the card connector according to a still further embodiment of the present invention, the positioning members additionally comprise a front end positioning member configured to come into contact with a front end face of a first type of card to thereby perform positioning of the said first type of card in the front and rear direction thereof.

In accordance with the present invention, the card connector discriminates a type of card by using the positioning members provided in the cover member. Hence, the card connector has a small size with a minute thickness dimension thereof and is able to discriminate a plurality of types of cards certainly to thereby identify each thereof. Further, the card connector can surely prevent a card from being mounted in a wrong location or at a wrong attitude thereof, thus ensuring that each of the plurality of types of cards can be exclusively mounted in position.

These and additional objects, features and advantages of the present invention will become apparent after reading the following detailed description of a preferred embodiment of the invention taken in conjunction with the appended drawings.

BRIEF DESCRIPTION OF THE DRAWINGS

FIG. 8A is a top plan view of a first surface of a second card for use with the card connector of FIG. 1;

FIG. 8B is a bottom plan view of the card of FIG. 8A;

DESCRIPTION OF THE PREFERRED EMBODIMENT

Preferred embodiments of the present invention will be described hereinbelow in detail with reference to the accompanying drawings.

Figure 1:
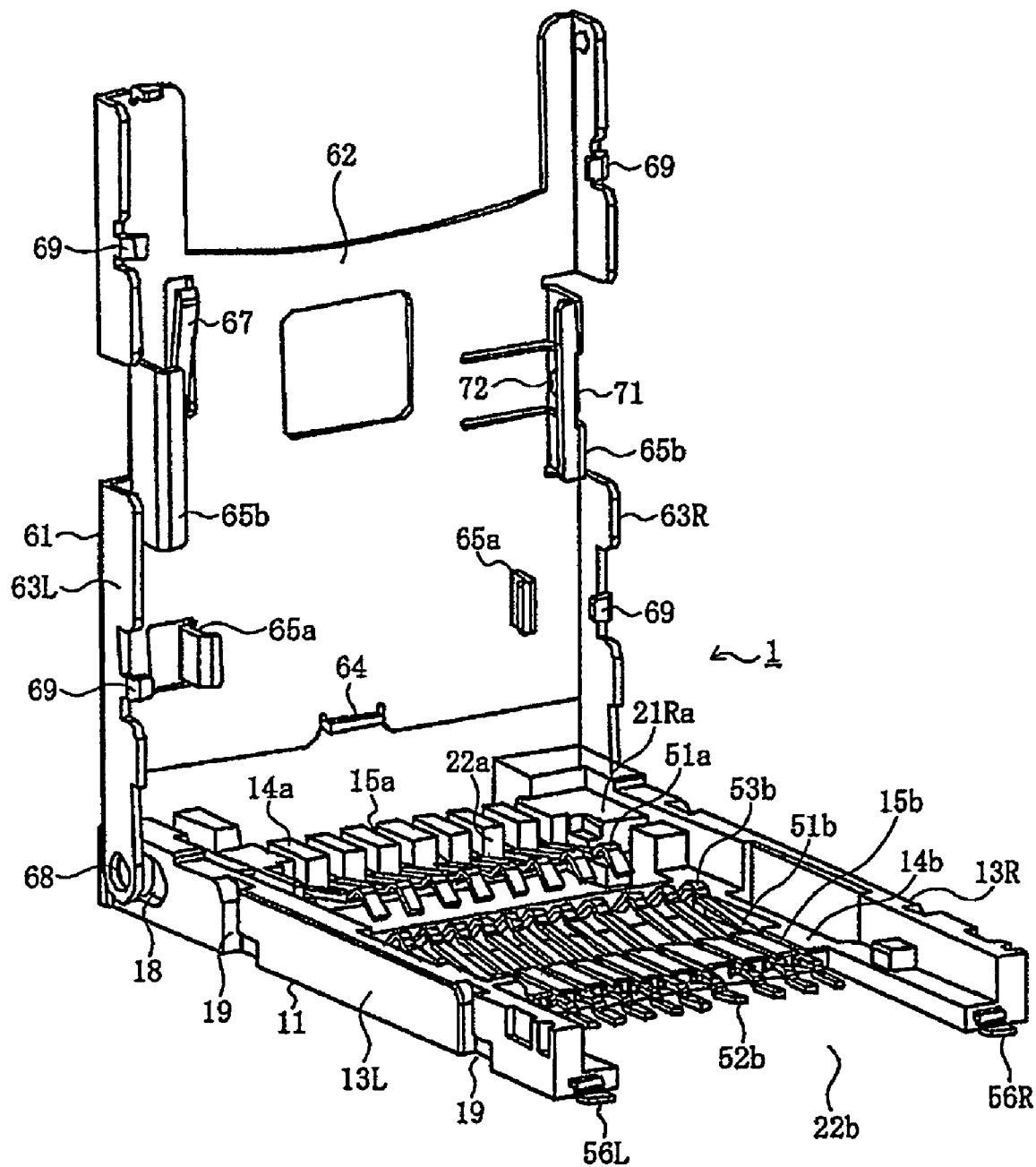
FIG. 1 is a perspective view of a card connector according to a first embodiment of the present invention with the shell in its open position.
Figure 2:
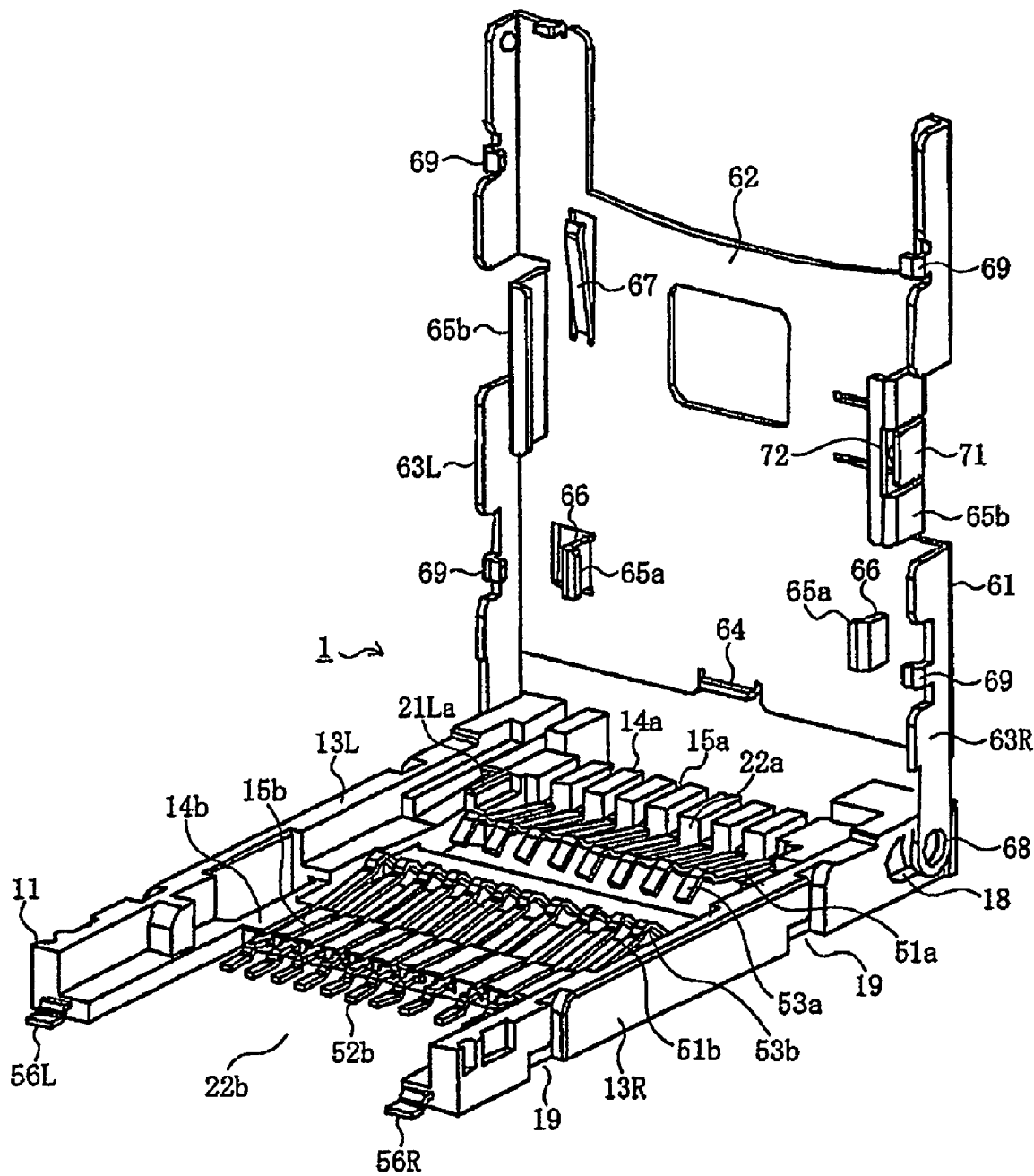
FIG. 2 is a second perspective view of the card connector of FIG. 1.

Referring to FIGS. 1 and 2, a card connector generally indicated at 1 is configured to be attached to an electronic device (not shown). A plurality of types of cards may be exclusively mounted in the card connector, and respective ones of the cards are thus exclusively mounted on the electronic device via the card connector 1.

In this case, any one of two predetermined types of cards (in other words, a first card 101a as a first type of card and a second card 101b as a second type of card) may be mounted at any time in the electronic device via the card connector 1. The electronic device may be, for example, a personal computer, a cellular phone, a PDA, a digital camera, a video camera, a music player, a game machine, a vehicle navigation device, or the like, but may be any type of device.

The first card 101a and the second card 101b are, for example, IC cards such as a SIM card, MMC®, a SD® card, a mini SD® card, a memory Stick®, a smart Media®, and a T-flash (trans flash) memory card, and may be any type of card, but this embodiment is described as an exemplary case where the first card 101*a* is a micro SD® card and the second card 101*b* is a memory stick Micro®. The second card 101*b* has a larger width than the first card 101*a*.

In this embodiment, representations of directions such as up, down, left, right, front, rear, and the like, used for explaining the structure and movement of each part of the card connector 1, and the like, are not absolute, but relative. These representations are appropriate when the card connector 1 and each part or element thereof is in the position shown in the figures. If the position of the card connector 1 and the parts thereof changes, however, it is assumed that these representations are to be changed according to the change of the position of the card connector 1 and the like.

The card connector 1 includes a housing 11, which is integrally formed of an insulating material such as synthetic resin and accommodates only any one of the first card 101*a* and the second card 101*b* at one time, and a shell 61, which is formed by stamping and bending a plate material made of a conductive material such as sheet metal and serves as a cover member pivotally connected to the housing 11. If desired, the shell may alternatively be made of a synthetic resin and could be plated if desired. The shell 61 is a member which functions as an EMI shield and provides coverage over an upper area of the housing 11. FIGS. 1 through 3A show a state in which the shell 61 is positioned at open position thereof in which a card may be inserted therein or removed therefrom. As shown in FIGS. 3B through 5, the card connector 1 has an approximately flat rectangular parallelepiped or a rectangular thick plate shape when the shell 61 is at the closed position thereof.

Figure 5:
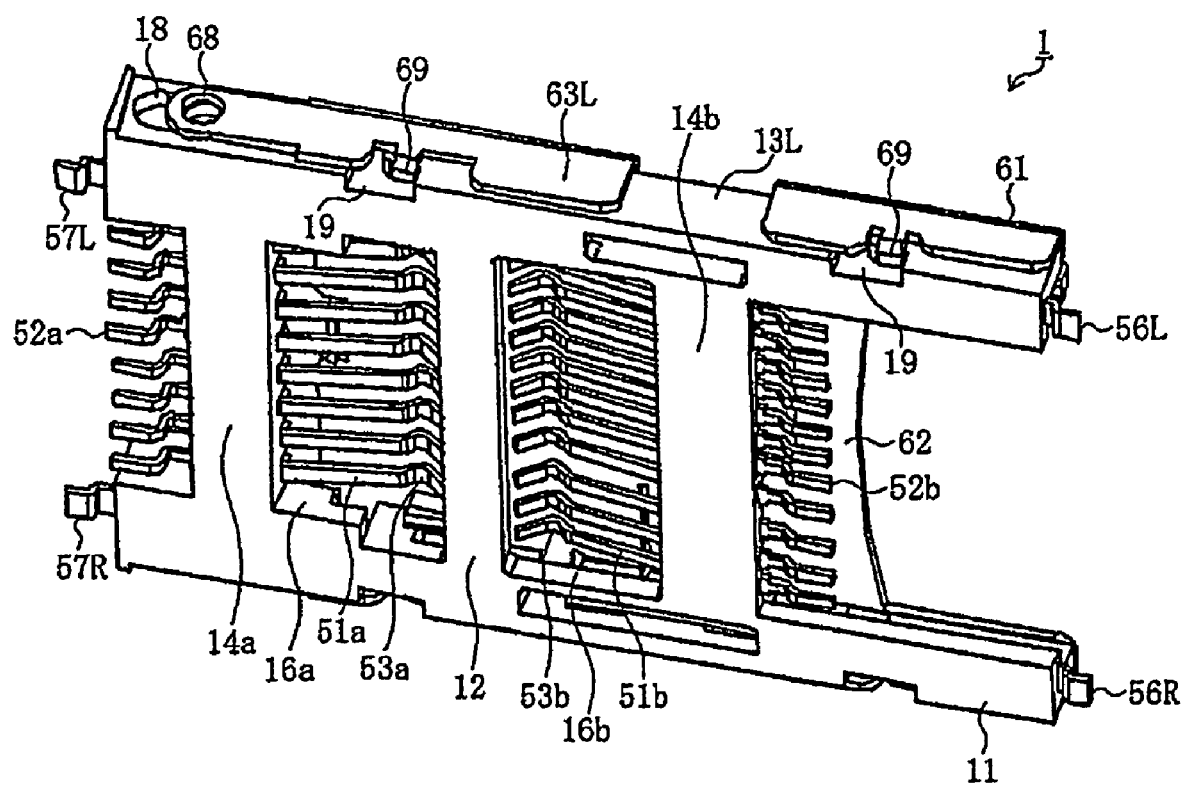
FIG. 5 is a bottom perspective view of the card connector of FIG. 1 wherein the shell is in its closed position.

As best illustrated in FIG. 5, the housing 11 includes a bottom wall portion 12 having a shape where a front edge side thereof, in other words, a front side (the right side in FIG. 5) thereof is cut out into an approximately "U" shape, and a left-side wall portion 13L and a right-side wall portion 13R which extend along both edges of the bottom wall portion 12 on opposite sides thereof and serve as side wall portions, respectively, project from the bottom wall portion 12. In the bottom wall portion 12, rectangular shaped first terminal accommodating recess portion 16*a* and second terminal accommodating recess portion 16*b* are formed. A plurality of first terminals 51*a* is arranged such that respective terminals 51*a* extend parallel to each other in the first terminal accommodating recess portion 16*a*, and a plurality of second terminals 51*b* is arranged such that respective terminals 51*b* extend parallel to each other in the second terminal accommodating recess portion 16*b*. The first and second terminals 51*a* and 51*b* extend in a direction generally parallel to the longitudinal axis of housing 11. The first terminal accommodating recess portion 16*a* is formed on a rear side (left in FIG. 5), and the second terminal accommodating recess portion 16*b* is formed on a front side (right in FIG. 5) of the first terminal accommodating recess portion 16*a*. In the illustrated example, the first terminal accommodating recess portion 16*a* and the second terminal accommodating recess portion 16*b* are formed as openings which extend through the bottom wall portion 12, but do not need to be openings and may be recessed portions with bottom walls.

Each of the first terminals 51*a*, which is a connecting terminal for the first card 101*a*, is formed of a conductive sheet material having an appropriate spring characteristic such as sheet metal. Each terminal 51*a* is formed into a cantilever-like form, and has a distal end portion 54*a* thereof attached to a first terminal attaching portion 14*a* of housing 11 arranged on the rearmost side (to the left in FIG. 5) of the first terminal accommodating recess portion 16*a* of the bottom wall portion 12. More specifically, the distal end portion 54*a* of each of the first terminals 51*a* is mounted in each of first terminal attaching grooves 15*a* (FIGS. 1, 2) formed in a surface of the first terminal attaching portion 14*a*. A frontmost end portion of each of the first terminals 51*a* is a contact portion 53*a* which extends towards the front side (right side in FIG. 5) while being obliquely directed in an upward direction within the first terminal accommodating recess portion 16*a* thereby projecting above an upper surface of the bottom wall portion 12 and into the card receiving opening. Each contact portion 53*a* elastically contacts its respective contact pad 151*a* which is arranged on a first surface 118*a* of the first card 101*a* (as described below), and is electrically connected thereto. Further, a solder tail portion 52*a* (FIG. 5), which extends in an opposite direction of the contact portion 53*a* from the distal end portion 54*a* of each of the first terminals 51*a*, projects from a rear-side edge of the first terminal attaching portion 14*a* towards a further rearward direction and is configured to be electrically connected to a contact pad or the like formed in a circuit member or board or the like of the electronic device.

Figure 6:
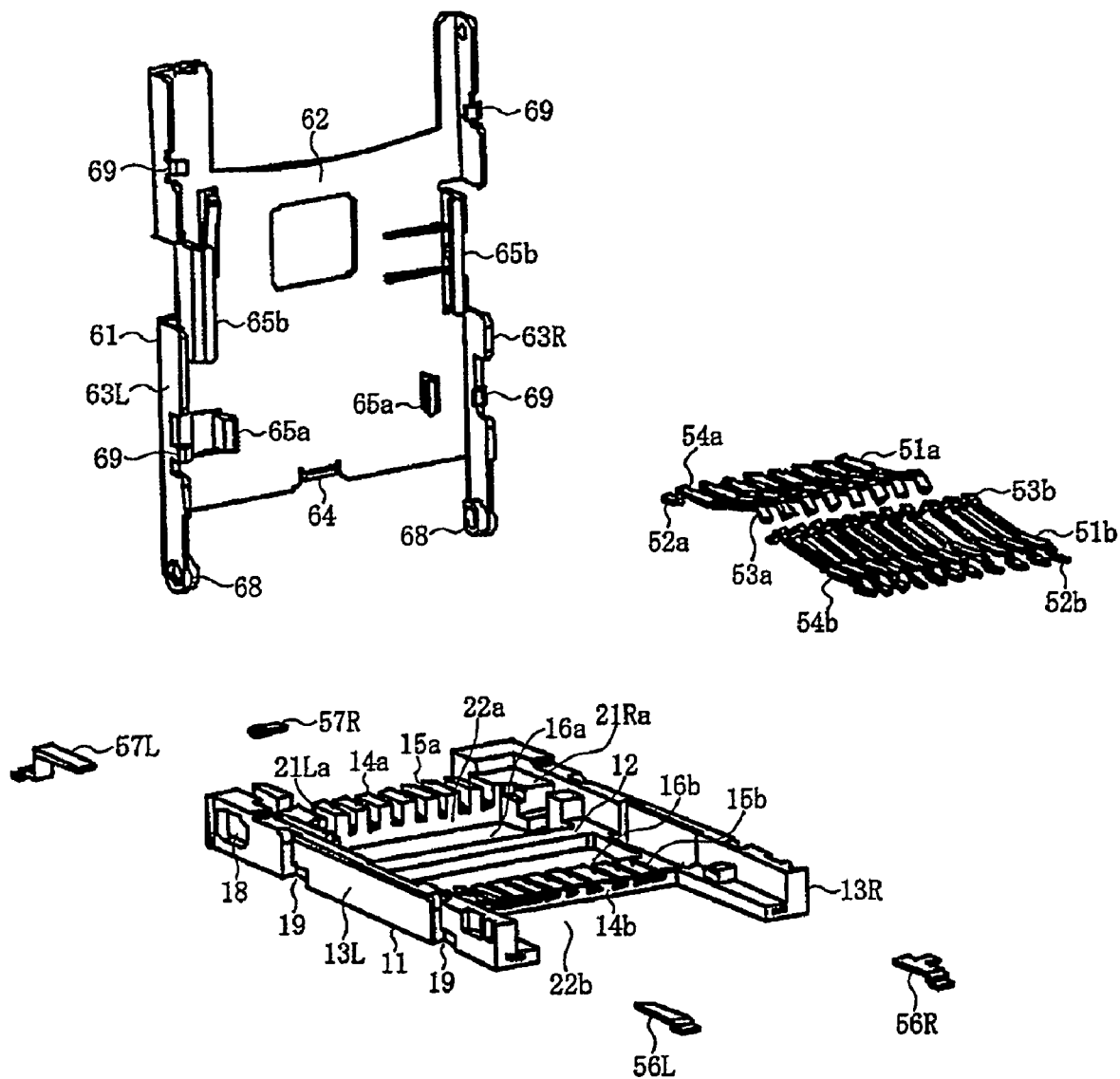
FIG. 6 is an exploded perspective view of the card connector of FIG. 1.

Each of the second terminals 51*b*, which is a connecting terminal for the second card 101*b*, is also formed of a conductive sheet material having an appropriate spring characteristic such as sheet metal. Each terminal 51*b* is formed into a cantilever-like form, and has a distal end portion 54*b* thereof (FIG. 6) attached to a second terminal attaching portion 14*b* of the bottom wall portion 12 arranged on a front side (right in FIG. 5) of the second terminal accommodating recess portion 16*b*. More specifically, the distal end portion 54*b* of each of the second terminals 51*b* is mounted in each of second terminal attaching grooves 15*b* (FIGS. 1, 2) formed in a surface of the second terminal attaching portion 14*b*. Further, an end portion of each of the second terminals 51*b* is a contact portion 53*b* (FIGS. 1 and 5) which extends towards the rear side within the second terminal accommodating recess portion 16*b* while being obliquely directed in an upward direction thereby projecting above an upper surface of the bottom wall portion 12 and into the card receiving opening. The contact portion 53*b* elastically contacts with its respective contact pad 151*b*, which is arranged on a first surface 118*b* of the second card 101*b* (as described below), to be electrically connected thereto. Further, a solder tail portion 52*b* (FIG. 1), extends in a direction opposite to the extending direction of the contact portion 53*b* from the distal end portion 54*b* of each of the second terminals 51*b*, and projects from a front-side edge of the second terminal attaching portion 14*b* towards a frontward direction (to the right in FIG. 5) to be capable of being electrically connected, by soldering or the like, to a contact pad, or the like formed on a circuit member or board of the electronic device.

Furthermore, a left front nail 56L and a left rear nail 57L serving as auxiliary metallic mounting brackets are attached to the front-side end and the rear-side end of the left-side wall portion 13L which extends in the front and rear direction (right and left in FIG. 5) along the side edge of the bottom wall portion 12 on the left side. Similarly, a right front nail 56R and a right rear nail 57R serving as auxiliary metallic mounting brackets are attached to the front-side end and the rear-side end of the right-side wall portion 13R which extends in the front and rear direction along the side edge of the bottom wall portion 12 on the right side. The left front nail 56L and the left rear nail 57L, as well as the right front nail 56R and the right rear nail 57R are fixedly secured to connecting portions formed on a circuit member or board or the like such as by soldering in order to secure the card connector 1 to the circuit board of an electronic device.

Furthermore, a first left-side engaging raised portion 21La is formed on an inner side of the left-side wall portion 13L and is configured to be engaged with a later-described side face portion 117a on the left side of the first card 101a near a front end thereof. A first right-side engaging raised portion 21Ra is formed on an inner side of the right-side wall portion 13R and is configured to be engaged with a later-described side face portion 117a on the right side of the first card 101a near the front end thereof. A first card accommodating cavity portion or receptacle 22a is a hollow chamber portion defined by the bottom wall portion 12, the first terminal attaching portion 14a, the first left-side engaging raised portion 21La and the first right-side engaging raised portion 21Ra. Further, on the front side of the first card accommodating cavity portion 22a, a second card accommodating cavity portion 22b is a hollow chamber portion defined by the bottom wall portion 12, the front-side edges of the first left-side engaging raised portion 21La and the first right-side engaging raised portion 21Ra, and the left-side wall portion 13L and the right-side wall portion 13R. An end face on the front side of the second card accommodating cavity portion 22b is formed as an open end face. Also, an upper surface of the first card accommodating cavity portion 22a and the second card accommodating cavity portion 22b are formed as an open face.

The first card accommodating cavity portion 22a has a widthwise dimension thereof that is smaller than the widthwise dimension of the first card 101a located near the rear end thereof as well as the widthwise dimension of the second card 101b, and is provided at a given location for exclusively accommodating therein a portion of the first card 101a near the front end thereof. On the other hand, the second card accommodating cavity portion 22b has a widthwise dimension thereof, which is larger than that of the first card accommodating cavity portion 22a and is provided as a given location suitable for accommodating therein each of the first card 101a and the second card 101b.

Figures 3A, 3B:
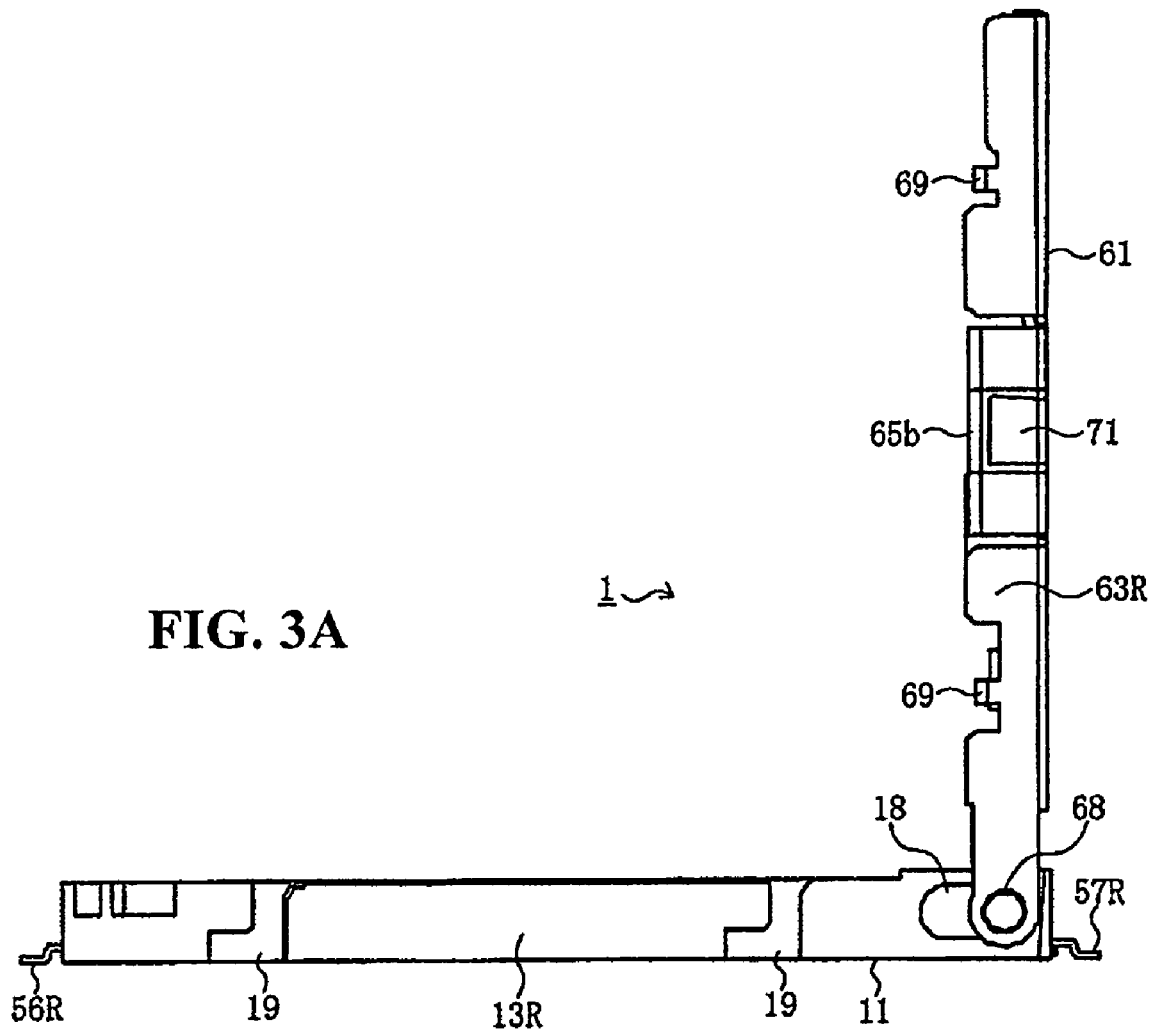
FIG. 3A is a side view illustrating the card connector of FIG. 1 wherein the shell is in its open position.
FIG. 3B is a side view similar to FIG. 3A but wherein the shell is in its closed position.
Figure 4:
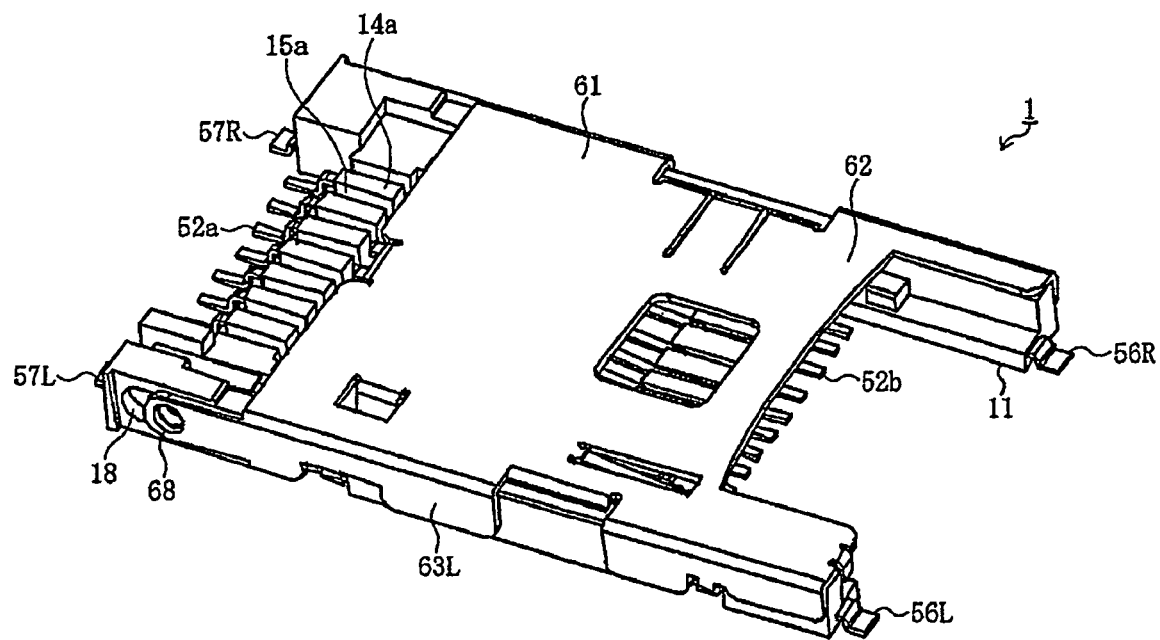
FIG. 4 is a perspective view of the card connector of FIG. 1 wherein the shell is in its closed position.

A pair of spaced apart shell engaging portions 19 are formed in each of the outer-side faces of the left-side wall portion 13L and the right-side wall portion 13R for holding the shell 61 in its closed position. Each of the shell engaging portions 19 is formed in an approximately "L" shaped when viewed from a side wall side (FIG. 3a). Upon rotating shell 61 to its closed position, shell engaging pieces 69 of the shell 61 enter in the shell engaging portions 19 through vertical portions thereof, and, upon sliding shell 61 to its closed position, engage the horizontal portions thereof. In the illustrated example, two shell engaging portions 19 are formed on each of the right and left sides, but a different number of the shell engaging portions 19 may also be used. For example, one shell engaging portion 19 may be formed on each of the right and left sides and only one shell engaging piece would be positioned on each side.

Furthermore, shaft engaging grooves 18 which extend in the front and rear direction are formed in vicinities of rear-side end portions on outer side faces of the left-side wall portion 13L and the right-side wall portion 13R. Pivotal shafts 68 of the shell 61 are received in the shaft engaging grooves 18 to permit pivot and sliding movement f shell 61.

Referring to FIG. 1, shell 61 includes a top plate portion 62 having an approximately rectangular shape, and a left-side face portion 63L and a right-side face portion 63R as side face portions extending downward in a front and rear direction thereof along side edges on both sides of the top plate portion 62. The left-side face portion 63L and the right-side face portion 63R are provided as members formed of a metallic plate or the like integrally with the top plate portion 62, and formed by bending downward the plate material at an approximately right angle with respect to the top plate portion 62. The pivotal shafts 68 are formed in end portions on the rear side (the lower side in FIGS. 1 and 2) of the left-side face portion 63L and the right-side face portion 63R. The pivotal shafts 68 respectively project inwardly from inner side faces of the left-side face portion 63L and the right-side face portion 63R at positions located nearly at the rear side of both portions 63L and 63R, and are inserted in the shaft engaging grooves 18 of the housing 11 to be pivotable and slidable therein. Hence, the shell 61 can be pivoted with respect to the housing 11 and can slide in the front and rear direction.

An end positioning projection 64 serving as an end positioning member, and a pair of first card side face holding projections 65a and a pair of second card side face holding projections 65b serving as side face positioning members are integrally formed as positioning members in an inner surface of the top plate portion 62, which faces the bottom surface of the housing when the shell 61 is at the closed position thereof. In the illustrated example, the end positioning projection 64, the first card side face holding projections 65a and the second card side face holding projections 65b are formed by stamping and forming the metal shell to lift up and bend several portions of the top plate portion 62 so they project at a right angle (in a downward direction in FIG. 3B) from the top plate portion 62.

The end positioning projection 64 is formed along an edge of the top plate portion 62 on a rear side or edge thereof, and contacts a later-described front end face 116a of the first card 101a, thus achieving positioning of the first card 101a held by the shell 61 in the front and rear direction.

The first card side face holding portions 65a engage the left and right side face portions 117a of the first card 101a near the front end thereof, respectively, thus achieving positioning of the first card 101a held by the shell 61 in the right and left direction, in other words, in the widthwise direction. In this case, a distance between the first card side face holding projections 65a on the left and right sides is approximately equal to the distance between the side face portions 117a of the first card 101a on the left and right sides near the front end thereof. In other words, the distance between projections 65a is either equal to or slightly larger than a width of a portion of the first card 101a located closely to the front end thereof, and is designed to be narrower than the width of the second card 101b. End portions of the first card side face holding projections 65a are bent to be approximately parallel to the top plate portion 62, and engage with the first surface 118a of the first card 101a.

Through such structure, while the shell 61 is being moved from an open position thereof to the closed position thereof, the first card 101a is maintained in a state where the first card 101a is held on the shell 61 by the first card side face holding projections 65a. Front side ends 66 of the first card side face holding projections 65a is able to come into contact with a later-described front end face 116b of the second card 101b when the second card 101b is mounted, and perform positioning of the second card 101b held by the shell 61 in the front and rear direction.

Moreover, the second card side face holding projections 65b are formed in the top plate portion 62 in front of the first card side face holding projections 65a, and are configured to engage with the later-described left and right side face portions 117b of the second card 101b to perform positioning of the second card 101b in the right and left direction, namely, in the widthwise direction. In this case, a distance between the second card side face holding projections 65b on the left and right sides is approximately equal to the distance between the side face portions 117b on the left and right sides of the second card 101*b* located near the front end thereof. In other words, the distance between projections 65*b* is either equal to or slightly larger than the width of the second card 101*b*, and is designed to be wider than the width of the first card 101*b*. End portions of the second card side face holding projections 65*b* are bent to be approximately parallel to the top plate portion 62, so as to engage with the first surface 118*b* of the second card 101*b*.

Through such structure, while the shell 61 is being moved from an open position thereof to the closed position thereof, the second card 101*b* is maintained in a state where the second card 101*b* is held on the shell 61 by the second card side face holding projections 65*b*.

Incidentally, the top plate portion 62 is provided with a spring arm 67 formed therein as an urging member. The spring arm 67 is a cantilever-like member formed by stamping and forming the metal shell to lift and bend a part of the top plate portion 62, and an free end of the cantilever-like member protrudes from the top plate portion 62 so as to be capable of coming into contact with a second surface 119*b* of the second card 101*b* held by the second card side face holding projections 65*b*, thus pressing the second card 101*b* against the end portions of the second card side face holding projections 65*b* in order to stably hold second card 101*b*. Also, the spring arm 67 is configured to also contact the side face portion 117*a* on the left side of the first card 101*a* held by the first card side face holding projections 65*a*. Therefore, since the first card 101*a* is also positioned in the widthwise direction at a portion near the rear end of top plate 62, the first card 101*a* is stably held therein.

Furthermore, the top plate portion 62 is formed with a card engaging portion 71 to be engaged with later-described recess portions 112*a* and 112*b* of the first card 101*a* and the second card 101*b*. The card engaging portion 71 is formed in the top plate portion 62 so as to protrude from the top plate portion 62 in the right angle direction. In the card engaging portion 71, an engaging protrusion portion 72 projects from an inner side face and is designed to enter the recess portions 112*a* and 112*b*. In the illustrated example, the card engaging portion 71 and the second card side face holding projection 65*b* on the right side are formed at the same location, but the second card side face holding projection 65*b* on the right side and the card engaging portion 71 may be formed at locations which are separated from each other.

The left-side face portion 63L and the right-side face portion 63R are provided with the shell engaging pieces 69 in end edges thereof on a lower side (a lower side in FIG. 3B), in other words, on the opposite side of the top plate portion 62. The shell engaging pieces 69 are tongue-shaped members integrally formed so as to project from the left-side face portion 63L and the right-side face portion 63R, and are formed by bending at an approximately right angle with respect to the left-side face portion 63L and the right-side face portion 63R, and project in an inner direction approximately parallel to the top plate portion 62. When the shell 61 is pivoted to cover the upper area of the housing 11, the shell engaging pieces 69 first enter from the top into the vertical portions of the shell engaging portions 19 formed in the outer side faces of the left-side wall portion 13L and the right-side wall portion 13R, and further, when the shell 61 slides toward the front side, the shell engaging pieces 69 engage the horizontal portions of the shell engaging portions 19 so that the shell 61 is prevented from opening.

Figures 7A, 7B:
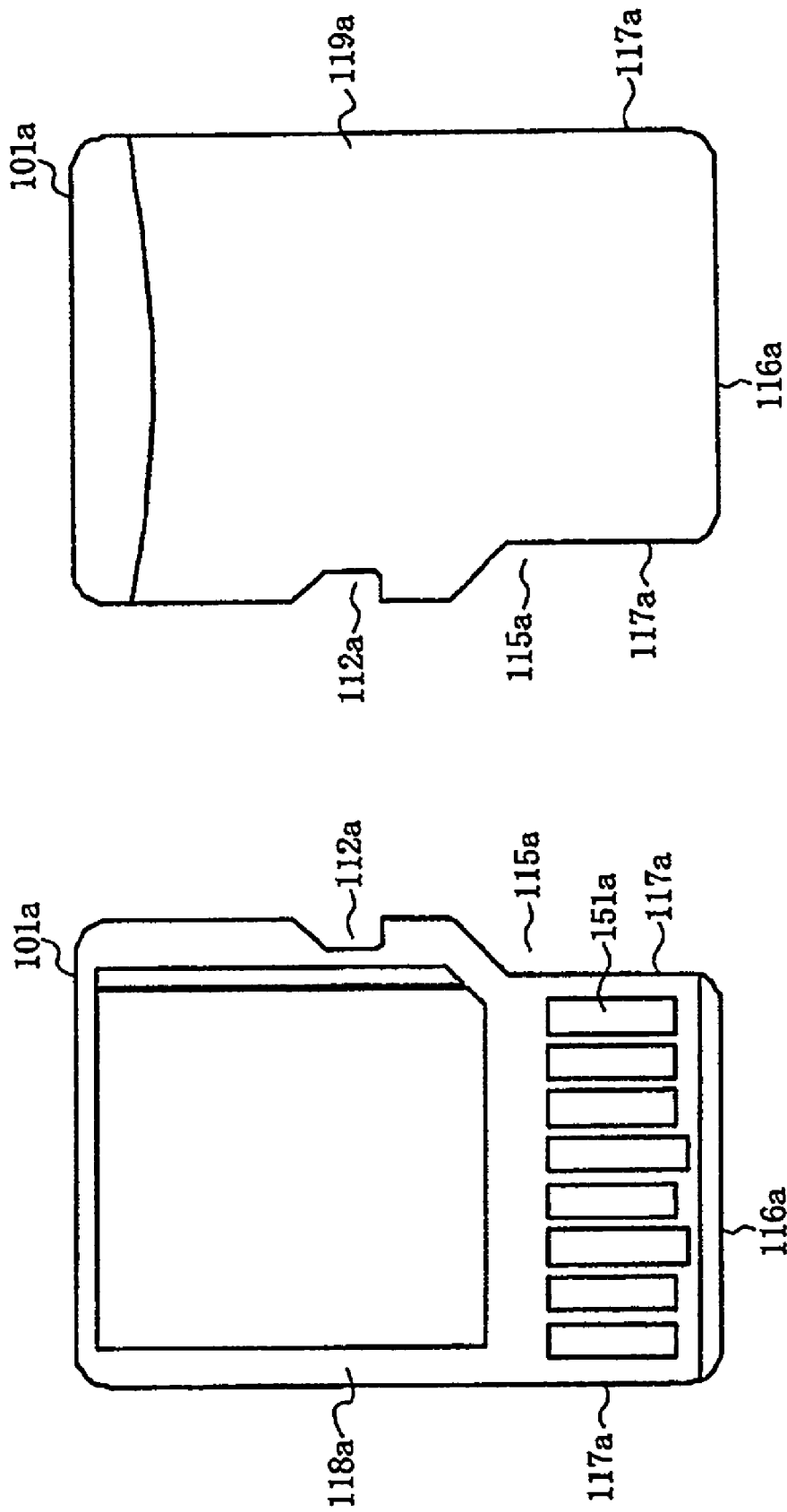
FIG. 7A is a top plan view of a first surface of a first card for use with the card connector of FIG. 1.
FIG. 7B is a bottom plan view of the card of FIG. 7A.

As described above, the first card 101*a* is a micro SD® card, which has an approximately rectangular plate-like shape as shown in FIGS. 7A and 7B and dimensions are 15.0 [mm] in length (top to bottom in FIGS. 7A and 7B), 11.0 [mm] in width (right to left in FIGS. 7A to 7B), and 0.7 [mm] in thickness (a dimension perpendicular to the sheet of the drawing of FIGS. 7A and 7B). Further, at a position near the front end of the first surface 118*a*, the plurality of contact pads 151*a* is arranged as an array along one end edge (i.e., an end edge on the side of the front end face 116*a*).

The recess portion 112*a* is formed in one of the side walls (the right side wall in FIG. 7A) of the first card 101*a*, and further, a front-side cutaway portion 115*a* is formed near the front end thereof. The front-side cutaway portion 115*a* is formed in a manner such that a corner portion between the front wall and the above-mentioned one of the side walls is removed over a predetermined area to show a cutaway of an approximately trapezoidal shape. Hence, a narrow portion is formed in a portion of the first card 101*a* near the front end thereof, in which the width thereof is smaller than the portion near the rear end thereof, and the dimension of width of the narrow portion is 9.7 [mm]. The left and right side faces of the narrow portion of the first card 101*a* are referred to as the side face portions 117*a* thereof.

The second card 101*b* is a memory stick Micro®, which has an approximately rectangular plate-like shape as shown in FIGS. 8A and 8B and dimensions thereof are 15.0 [mm] in length (top to bottom in FIGS. 8A and 8B), 12.5 [mm] in width (right to left in FIGS. 8A and 8B), and 1.2 mm] in thickness (a dimension perpendicular to the sheet of the drawings of FIGS. 8A and 8B). Further, at a position near the front end of the first surface 118*b*, the plurality of contact pads 151*b* is arranged as an array along one end edge (i.e., an end edge on the side of the front end face 116*b*). Further, the recess portions 112*b* are formed in the left and right side walls of the second card 101*b*.

The number, pitch and the like of the contact pads 151*b* of the second card 101*b* are different from the number, pitch and the like of the contact pads 151*a* of the first card 101*a*. Accordingly, the number, pitch and the like of the second terminals 51*b* of the card connector 1 corresponding to the contact pads 151*b* of the second card 101*b* are different from the number, pitch and the like of the first terminals 51*a* of the card connector 1 corresponding to the contact pads 151*a* of the first card 101*a*. Reference numeral 117*b* represents the side face portions as described before.

Figure 9:
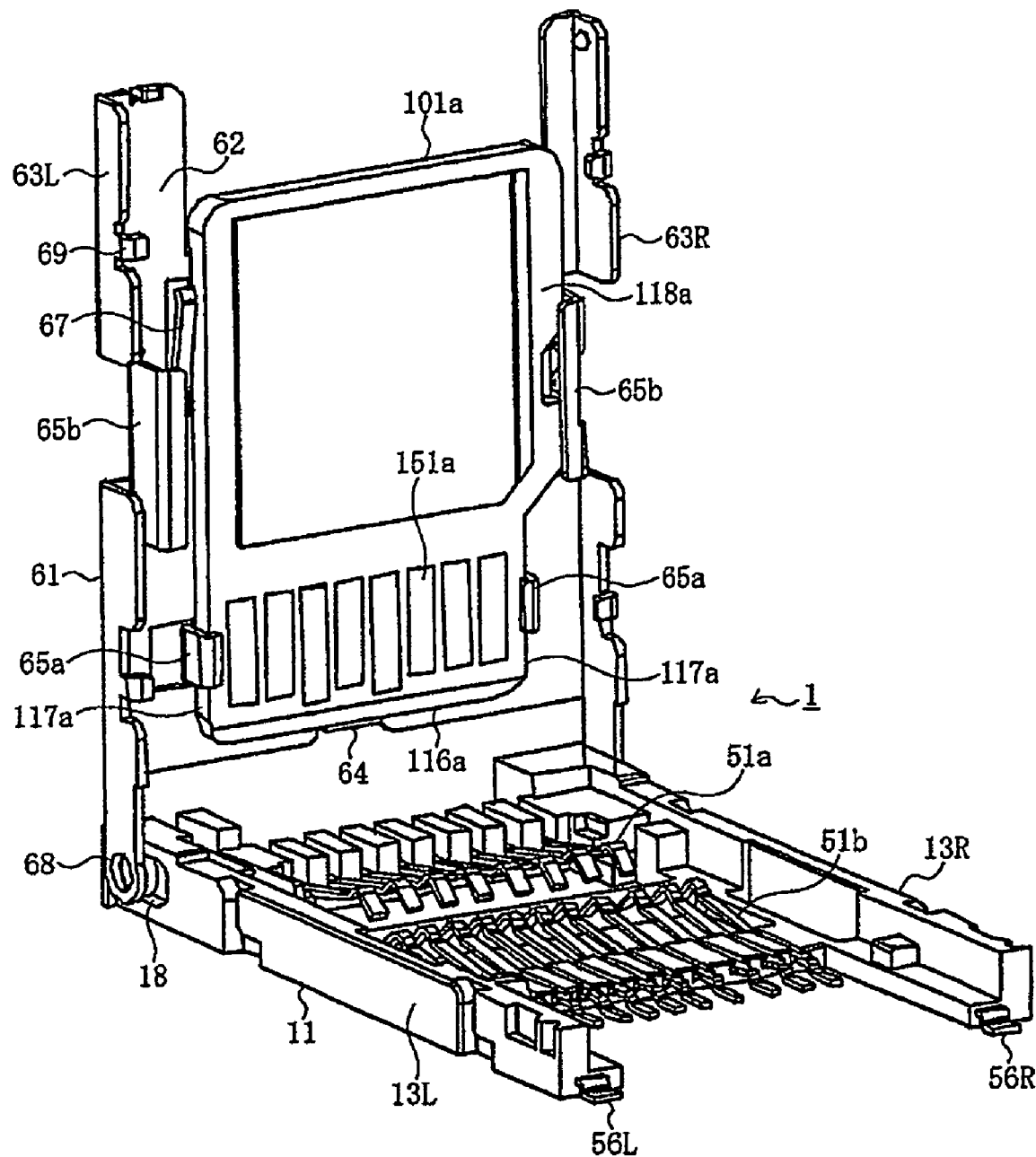
FIG. 9 is a perspective view similar to FIG. 1 but with a first card inserted in the shell of the card connector.

Shell 61 is brought to an open position thereof as shown in FIG. 9. In this case, it is desirable that the shell 61 is opened widely so that the angle of opening is 90 degrees or larger with respect to the housing 11 so that the first card 101*a* may be easily mounted therein.

Subsequently, a user or the like of an electronic device manually inserts the first card 101*a* in the shell 61 by using his/her fingers or the like. The attitude of the first card 101*a* is set such that the first surface 118*a* on which the contact pads 151*a* are arranged faces front, the second surface 119*a* faces the top plate portion 62, the front end face 116*a* faces down, and the left and right side face portions 117*a* face the left-side face portion 63L and the right-side face portion 63R, respectively. Thereafter, the first card 101*a* is moved from the top to the bottom of the shell 61 (as viewed in FIG. 9) while bringing the second surface 119*a* to do sliding contact with the top plate portion 62.

The first card 101*a* is moved so that the entire first card 101*a* passes between the second card side face holding projections 65*b* on left and right sides, and the narrow portion near the end thereof enters a space defined between the first card side face holding projections 65*a* on left and right sides. Since the distance between the second card side face holding projections 65*b* on the left and right sides is larger than the width of the first card 101*a*, the first card 101*a* can smoothly pass between the second card side face holding projections 65*b* on the left and right sides. By bringing the second surface 119*a* of the first card 101*a* in to sliding contact with the top plate portion 62, the end portions of the first card side face holding portions 65*a* and the first surface 118*a* of the first card 101*a* are brought into engagement with each other.

Thereafter, when the front end face 116*a* of the first card 101*a* comes into contact with the end positioning projection 64, the first card 101*a* stops moving and is positioned and held by the shell 61. Since the engaging protrusion portion 72 of the card engaging portion 71 enters and engages the recess portion 112*a* of the first card 101*a*, the first card 101*a* is secured in the shell 61 and the first card 101*a* is not displaced even if an external force such as a shock is applied to the card connector 1 or the first card 101*a*.

Figure 10:
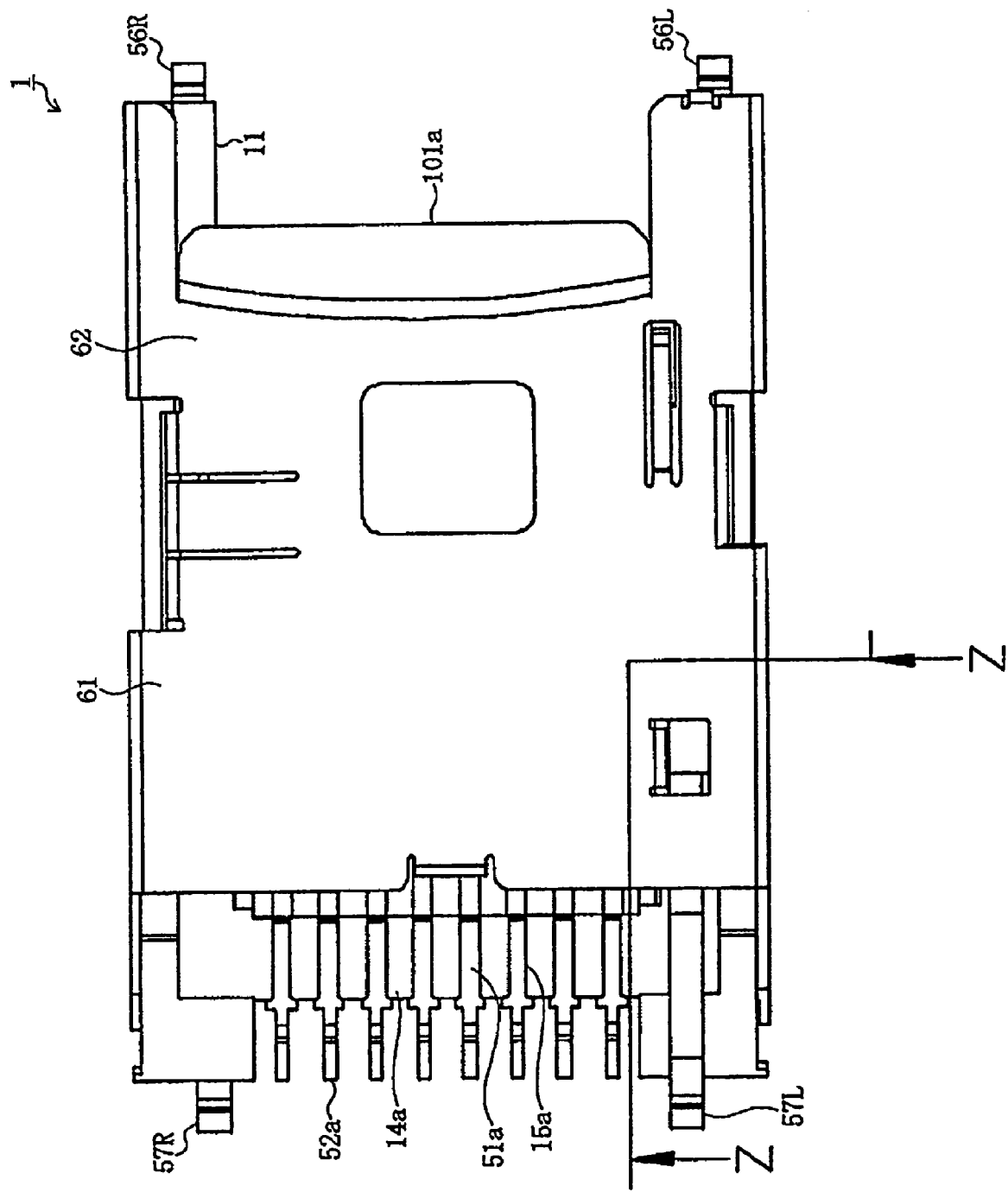
FIG. 10 is a top plan view of the card connector of FIG. 1 in which the shell is in its closed position and the first card is inserted therein.
Figure 11:
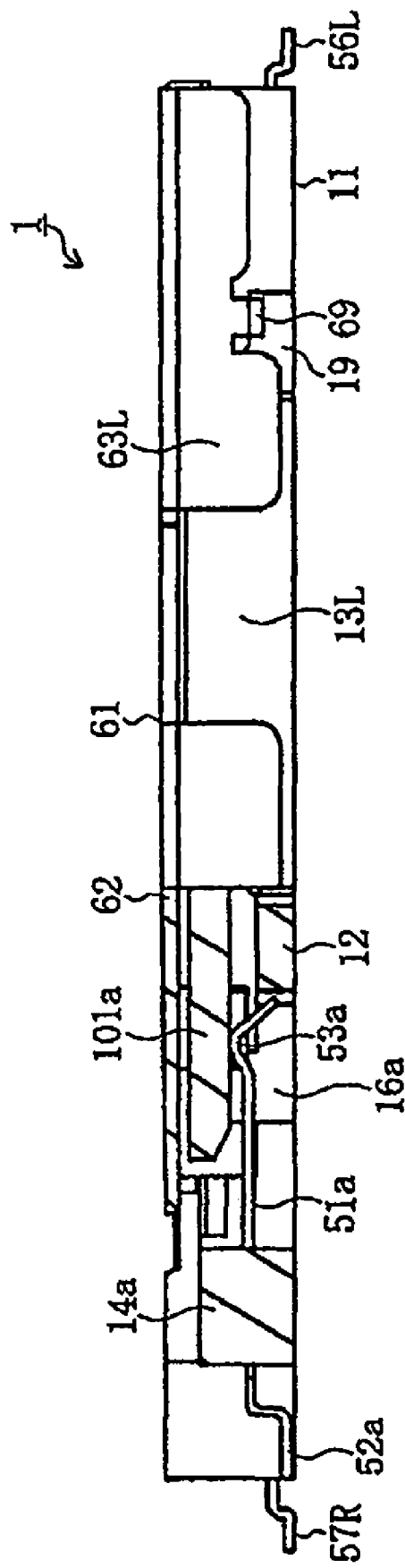
FIG. 11 is side view of the card connector of FIG. 10 with a partial cross-section taken generally along the line Z-Z of FIG. 10.

The user or the like subsequently rotates the shell 61 downward about the pivotal shafts 68 by using his/her finger or the like so that the shell 61 is brought into the closed position thereof. Hence, the first card 101*a* held by the shell 61 is accommodated within the first card accommodating cavity portion 22*a* and the second card accommodating cavity portion 22*b* of the housing 11. During such rotation, the shell engaging pieces 69 enter from the top into the vertical portions of the shell engaging portions or recesses 19 formed on the outer side faces of the left-side wall portion 13L and the right-side wall portion 13R of the housing 11. The user then slides the shell 61 toward the front side and the shell engaging pieces 69 engage the horizontal portions of the shell engaging portions 19 so that the shell 61 is prevented from opening (FIGS. 10 and 11).

In such position, the narrow portion of the first card 101*a* near the front end thereof is accommodated in the first card accommodating cavity portion 22*a* of the housing 11, and the portion closer to the rear end than the narrow portion is accommodated within the second card accommodating cavity portion 22*b*. Each of the contact pads 151*a* contacts the contact portion 53*a* of the corresponding first terminal 51*a*, to electrically connect each first terminal 51*a* to its respective contact pad, and is eventually electrically connected to a counterpart terminal member formed on the circuit board of the electronic device via the solder tail portion 52*a*. Each of the first terminals 51*a* is elastically deformed by engagement with the top of each of the contact pads 151*a* to create a spring force between the contact portion 53*a* and the contact pad 151*a*.

When the first card 101*a* is held by the shell 61, the front end face 116*a* thereof comes into contact with the end positioning projection 64, the left and right side face portions 117*a* thereof engage the first card side face holding projections 65*a* on the left and right sides, respectively, and the recess portion 112*a* of the first card 101*a* is engaged with the card engaging portion 71, so the first card 101*a* is accurately positioned in the front, rear, left and right directions. When the shell 61 is brought to the closed position thereof, the first card 101*a* is accurately positioned within the cavity portion of the housing 11, and each of the contact pads 151*a* accurately faces and contacts the corresponding first terminal 51*a*. As described, the user of the electronic device can accurately mount the first card 101*a* within the card connector 1 by performing the simple operation of mounting the first card 101*a* in the shell 61 and by rotating and then sliding the shell 61 about the pivot shafts 68.

Figure 12:
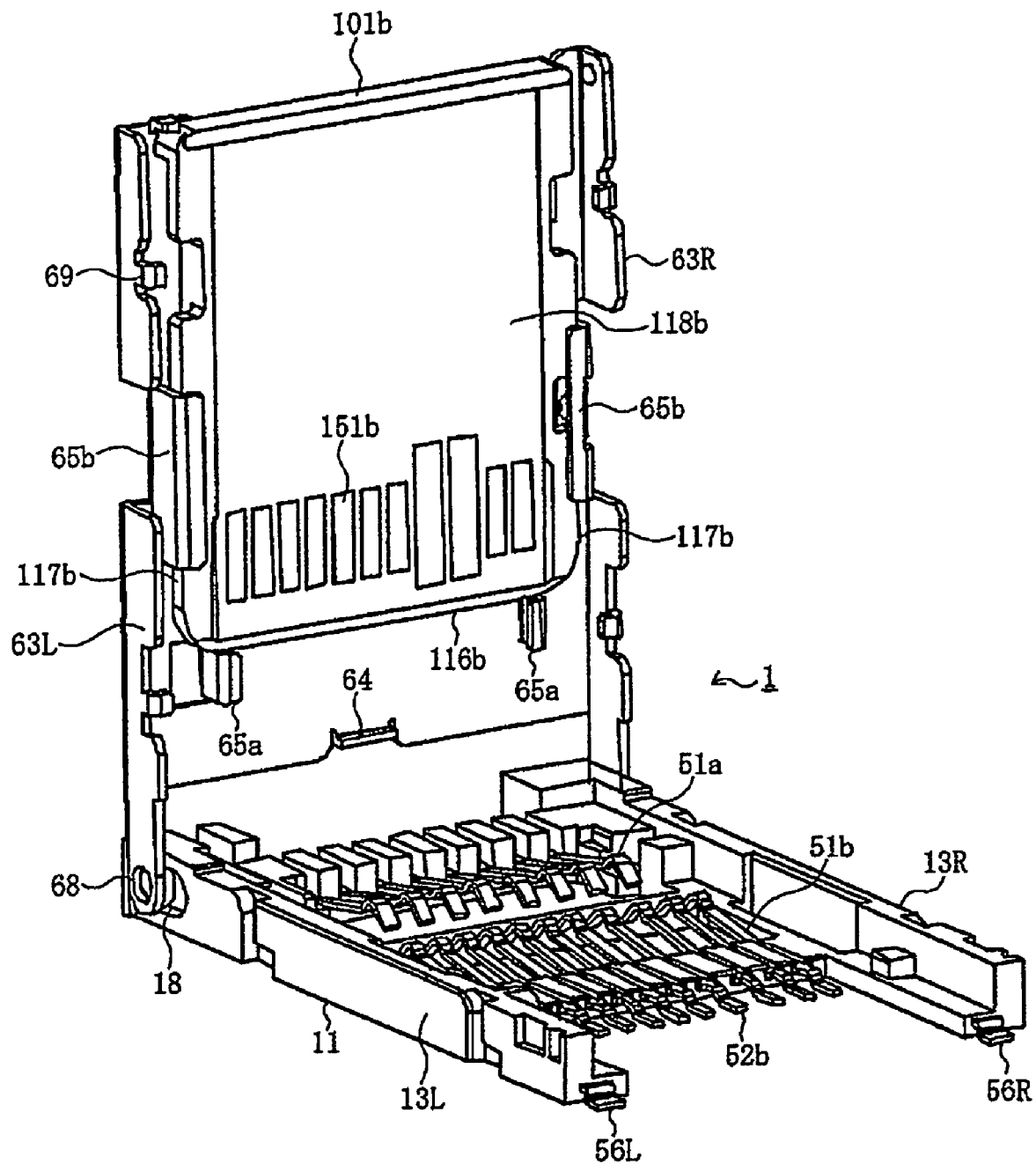
FIG. 12 is a perspective view similar to FIG. 9 but with a second card inserted in the shell of the card connector.
Figure 13:
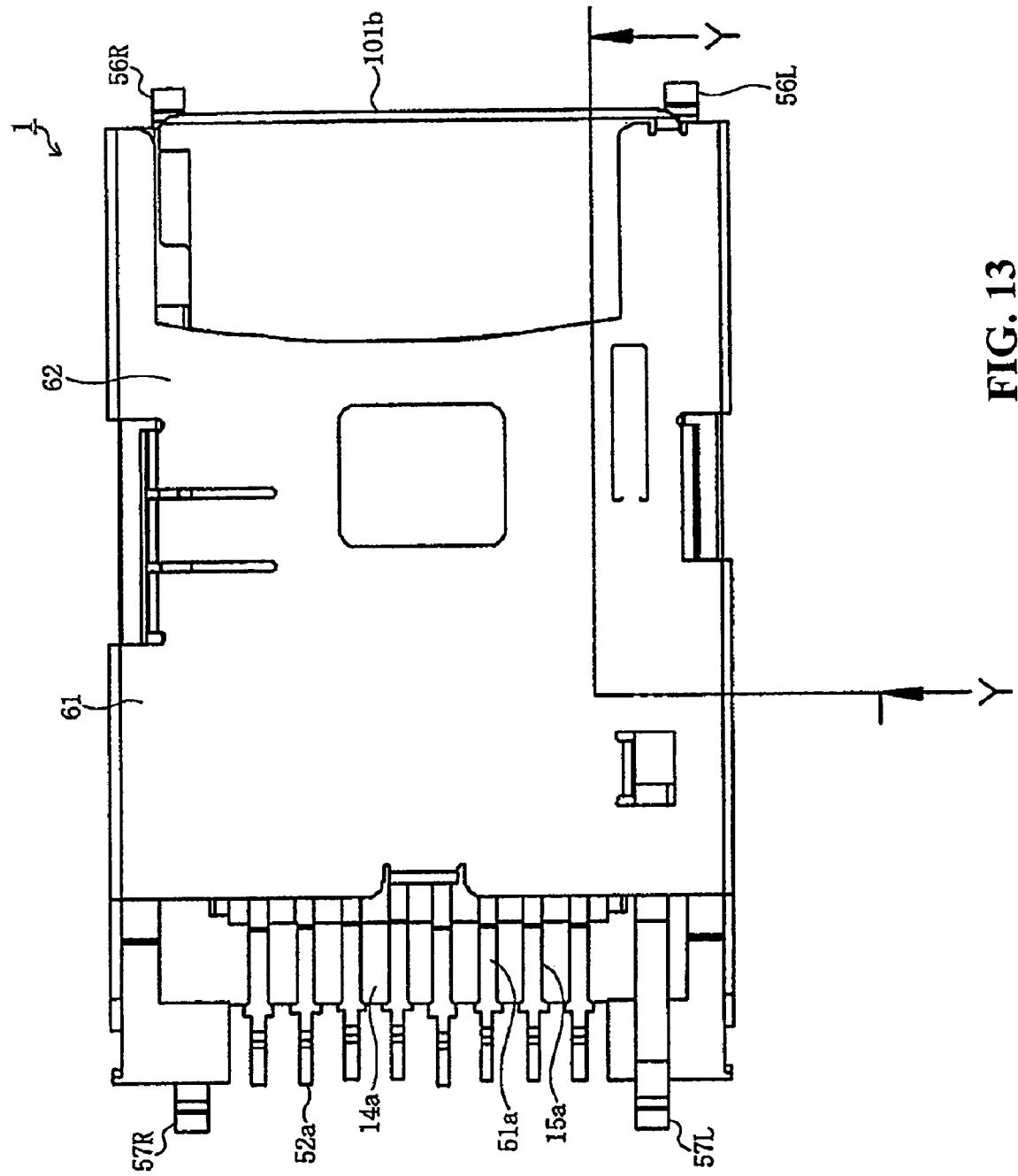
FIG. 13 is a top plan view similar to FIG. 10 but with the second card inserted therein.
Figure 14:
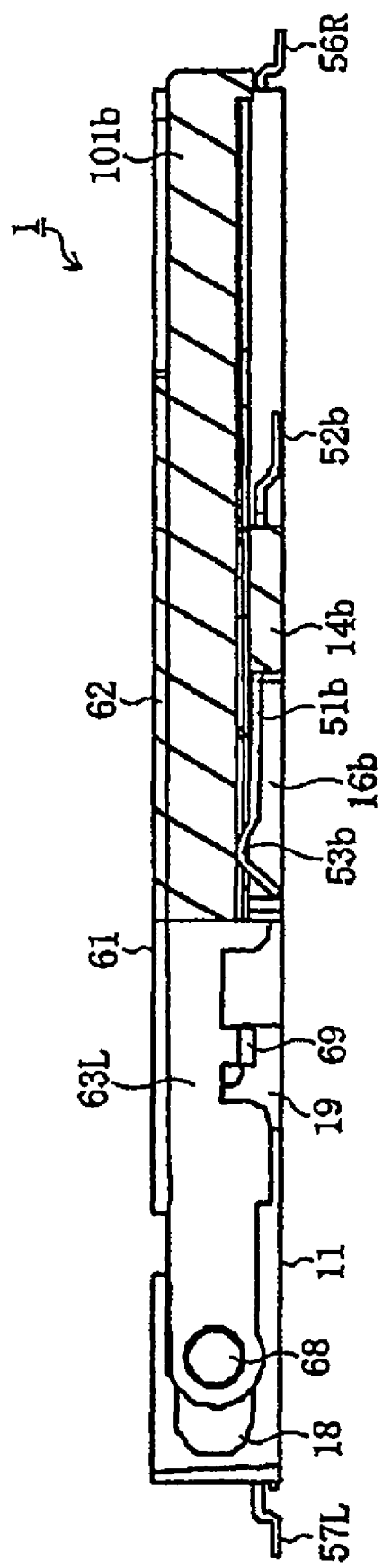
FIG. 14 is side view similar to FIG. 11 but with a partial cross-section taken generally along the line Y-Y of FIG. 13.
Figure 15:
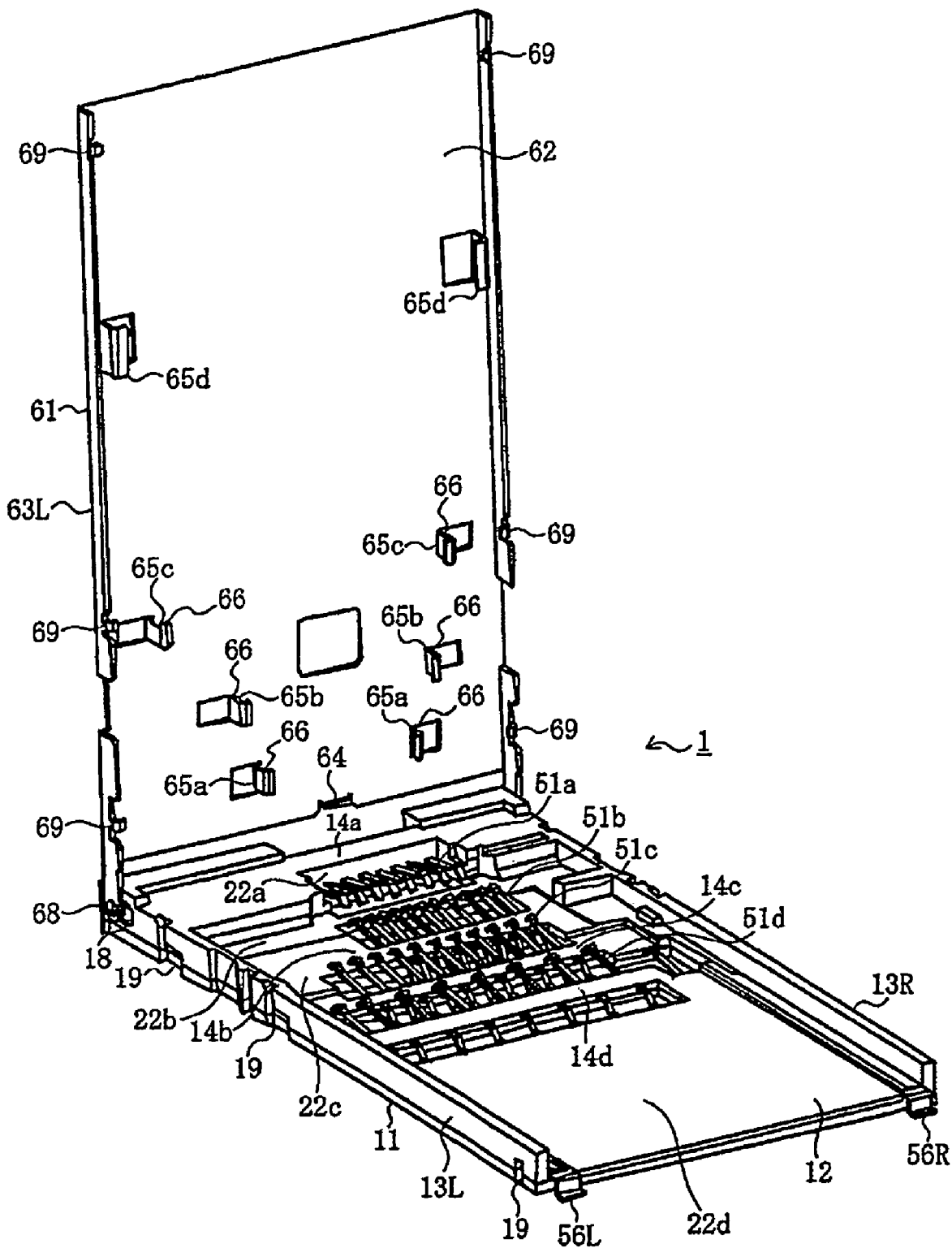
FIG. 15 is a perspective view of a card connector according to a second embodiment of the present invention with the shell in the open position.
Figure 16:
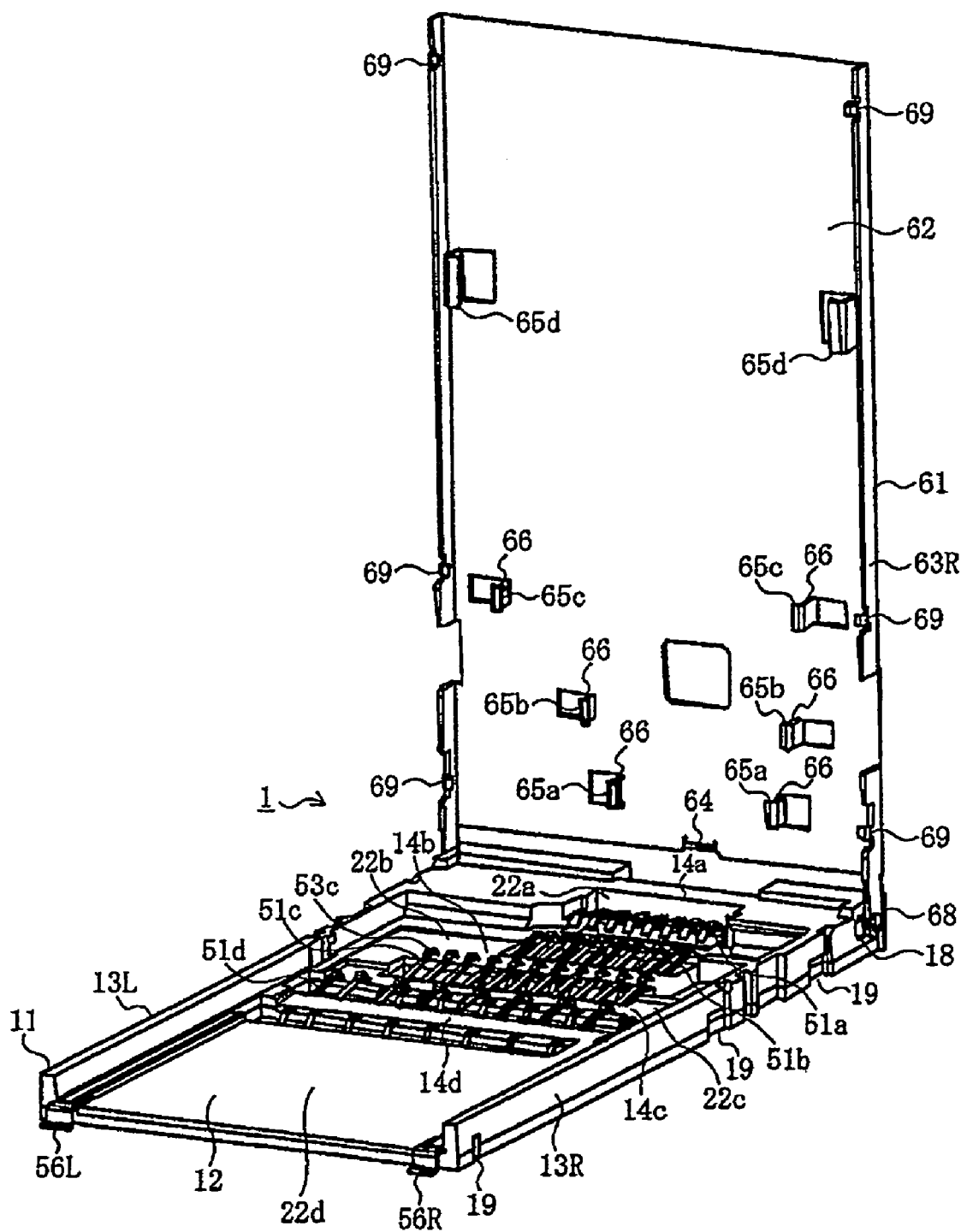
FIG. 16 is a second perspective view of the card connector of FIG. 15.
Figure 17:
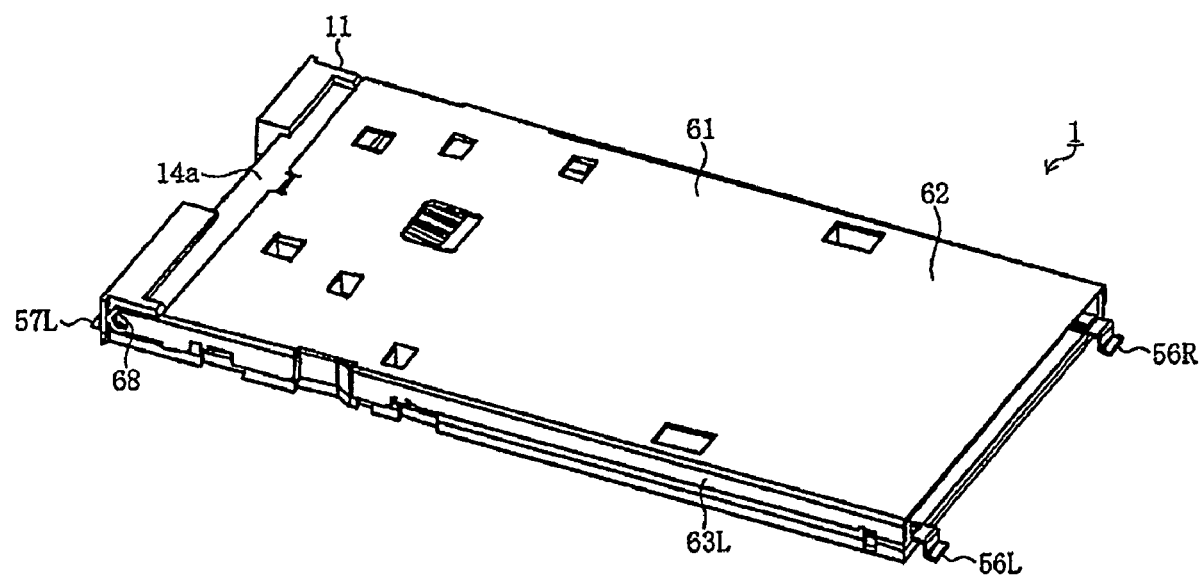
FIG. 17 is a third perspective view of the card connector of FIG. 15 but with the shell in its closed position.

Similarly to the case of the first card 101*a*, when mounting the second card 101*b*, the shell 61 is brought to an open position thereof as shown in FIG. 12. In this case, it is desirable that the shell 61 is widely opened so that an angle of opening is 90 degrees or larger with respect to the housing 11 so that the second card 101*b* can be easily inserted therein.

A user of an electronic device inserts the second card 101*b* in the shell 61 by using his/her fingers or the like. The attitude of the second card 101*b* is set such that the first surface 118*b* on which the contact pads 151*b* are formed faces front, the second surface 119*b* faces the top plate portion 62, the front end face 116*a* faces down, and the left and right side face portions 117*b* face the left-side face portion 63L and the right-side face portion 63R, respectively. Thereafter, the second card 101*b* is moved from the top to the bottom of the shell 61 (as viewed in FIG. 12) while bringing the second surface 119*b* to make sliding contact with the top plate portion 62.

The second card 101*b* is moved so that a portion of the second card 101*b* near the end thereof enters a space between the second card side face holding projections 65*b* on the left and right sides. By bringing the second surface 119*b* of the second card 101*b* to make sliding contact with the top plate portion 62, the end portions of the second card side face holding projections 65*b* and the first surface 118*b* of the second card 101*b* are brought into engagement with each other.

Thereafter, when the front end face 116*b* comes into contact with the first card side face holding projections 65*a* on the left and right sides, the second card 101*b* stops moving and the position thereof is determined. Since the distance between the first card side face holding portions 65*a* on the left and right sides is set to be smaller than the width of the second card 101*b*, the second card 101*b* cannot enter the space between the first card side face holding projections 65*a* on the left and right sides, and the front end face 116*b* is stopped when it engages the first card side face holding projections 65*a*. Thus, the first card side face holding projections 65*a* function as the end positioning member for the second card 101*b*, in a similar manner to the end positioning projection 64 for the first card 101*a*.

As shown in FIG. 12, the second card 101*b* is held in position by the shell 61. Since the engaging protrusion portion 72 of the card engaging portion 71 enters and engages one of the recess portions 112*b* of the second card 101*b*, the second card 101*b* is secured in the shell 61 and is not displaced even if an external force such as a shock is applied to the card connector 1 or the second card 101*b*.

The user or the like rotates the shell 61 downward about the pivotal shafts 68 by using his/her finger or the like so that the shell 61 comes to the closed position thereof. Hence, the second card 101*b* held by the shell 61 is accommodated in the second card accommodating cavity portion 22*b* of the housing 11. The second card 101*b* is not accommodated in the first card accommodating cavity portion 22*a*. The shell engaging pieces 69 enter from the top into the vertical portions of the shell engaging portions 19 formed on the outer side faces of the left-side wall portion 13L and the right-side wall portion 13R of the housing 11. When the user or the like slides the shell 61 toward the front side, the shell engaging pieces 69 engage horizontal portions of the shell engaging portions 19 so that the shell 61 is prevented from opening.

In such position, the entire second card 101*b* is accommodated in the second card accommodating cavity portion 22*b*. Each of the contact pads 151*b* contacts the contact portion 53*b* of the corresponding second terminal 51*b*, to electrically connect each second terminal 51*b* to its respective contact pad and is electrically connected to a counterpart terminal member formed on the circuit board of the electronic device via the solder tail portion 52*b*. Each of the second terminals 51*b* is elastically deformed by engagement with the top of each of the contact pads 151b to create a spring force between the contact portion 53b and the contact pad 151b.

When the second card 101b is held by the shell 61, the front end face 116b thereof comes into contact with the first card side face holding projections 65a, the left and right side face portions 117b are engaged with the second card side face holding projections 65b on the left and right sides, respectively, and one of the recess portions 112b is engaged with the card engaging portion 71, so the second card 101b is accurately positioned in the front, rear, left and right directions. When the shell 61 is brought to the closed position thereof, the second card 101b is accurately positioned in the cavity portion of the housing 11, and each of the contact pads 151b accurately faces and contacts the corresponding second terminal 51b. As described, the user of the electronic device is able to accurately mount the second card 101b within the card connector 1 by performing the simple operation of mounting the second card 101b in the shell 61 and by rotating and then sliding the shell 61.

As described above, in the present embodiment, by exclusively mounting either one of the first card 101a and the second card 101b, which are two different types of cards, namely, n types (n=2) of cards, in the shell 61 held at the opened position thereof and bringing the shell 61 to the closed position thereof, any one of the first card 101a and the second card 101b is accommodated into the corresponding location within the cavity portions of the housing 11, and are electrically connected to the corresponding terminals, namely, the first terminals 51a and the second terminals 51b of the card connector 1.

The shell 61 is provided with n types of card side face holding projections. In other words, the first card side face holding projections 65a and the second card side face holding projections 65b act as card positioning members, and the cards are discriminated by engaging the side face portions of the cards 101a and 101b with the corresponding card side face holding projections mentioned above. This means that the card which enables the left and right side face portions thereof to be engaged with the first card side face holding projections 65a on the left and right sides is not the second card 101b, but the first card 101a, whereas a card which enables the left and right side face portions thereof to be engaged with the second card side face holding projections 65b is not the first card 101a but the second card 101b. Accordingly, the first card 101a and the second card 101b are surely discriminated by the first card side face holding projections 65a and the second card side face holding projections 65b.

Therefore, even when the card connector 1 is mounted in a narrow space left in a small-sized electronic device, and there is no space available in the front, rear, left and right sides of the card connector 1, mounting of a card may be accomplished by closing the shell 61 after the card is mounted in the shell 61. Moreover, since any one of the "n" types of cards are exclusively mounted, it is not necessary to increase dimensions of the shell 61 and the housing 11 in the thickness direction, and as a result, a low-profile card connector 1 is realized.

Further, the positions of accommodation of the respective cards in the shell 61 and the housing 11 are set to be shifted from each other in a longitudinal direction (i.e., in the front and rear direction of the shell 61, housing 11, and the respective cards), and the positions of the terminals corresponding to the respective cards are set to be shifted from those in the neighboring group of terminals. Therefore, "n" types of cards having different number and pitch of contact pads can be mounted without enlarging the housing 11.

Furthermore, all types of cards can be mounted in the shell 61 in identical orientation and direction (in which the second surface thereof, on which no contact pads are formed, faces the top plate portion 62, and the front end thereof adjacent which the contact pads are formed face the same direction). Therefore, the cards can be mounted in an accurate direction and attitude, thus lowering a possibility of occurrence of erroneous mounting of the cards.

When a larger card is mounted in the shell 61, the card side face holding projections for a card which is one size smaller function as the front end positioning members. Therefore, the number of positioning members contained in the shell 61 can be reduced, and the structure of the shell 61 can be simplified.

Since "n" types of cards can be mounted on only one card connector 1, it is not necessary to mount a plurality of diverse connectors, which correspond to various types of cards in an electronic device, thus permitting downsizing and higher density of electronic devices.

Next, a description of the second embodiment of the present invention will be provided hereinbelow. The members having like or identical structures as those in the first embodiment will be designated by the same reference numerals and descriptions thereof will be omitted. Descriptions of the same operations and effects as those in the first embodiment will also be omitted.

The present embodiment is described as another example of a card connector 1, which allows any one of "n" types of cards to be exclusively mounted therein, and "n" is 4 (four) in this case. This means, in the card connector 1 according to this embodiment, any one of the first card 101a, the second card 101b, and additional two types of cards, in other words, a third card 101c as a third type of card and a fourth card 101d as a fourth type of card can be exclusively mounted. The first card 101a to the fourth card 101d may be any types of cards, but the present embodiment is described as a case where the first card 101a and the second card 101b are a micro SD® card and a memory stick Micro®, respectively, like the first embodiment, and the third card 101c is a mini SD® card, and the fourth card 101d is a SD® card.

In this embodiment, the first card 101a has the smallest width, the second card 101b has a larger width than the first card 101a, the third card 101c has a larger width than the second card 101b, and the fourth card 101d has a still larger width than the third card 101c. This means that the "n"th type of card has a larger width than the "n−1"th type of card.

Figure 18:
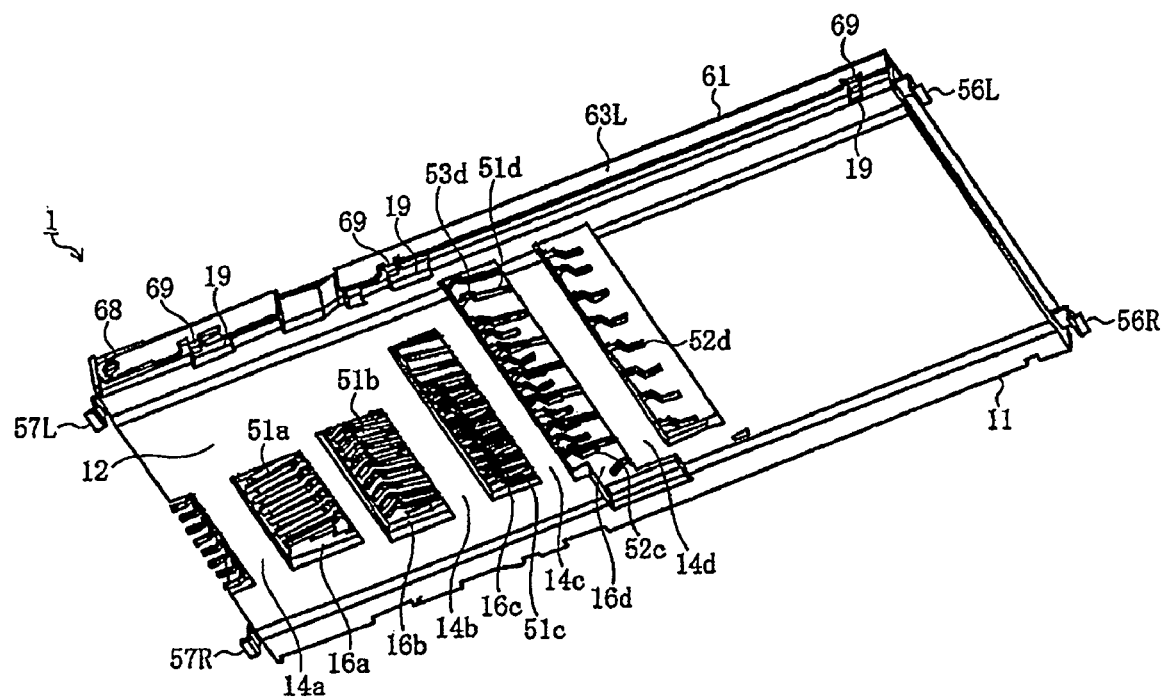
FIG. 18 is a fourth perspective view of the card connector of FIG. 15 but with the cover removed.

In a bottom wall portion 12 of a housing 11, a quadrate first terminal accommodating recess portion 16a, a second terminal accommodating recess portion 16b, a third terminal accommodating recess portion 16c, and a fourth terminal accommodating recess portion 16d are formed as best shown in FIG. 18. A plurality of first terminals 51a is arranged as an array in the first terminal accommodating recess portion 16a, a plurality of second terminals 51b is arranged in an array in the second terminal accommodating recess portion 16b, a plurality of third terminals 51c is arranged as an array in the third terminal accommodating recess portion 16c, and a plurality of fourth terminals 51d is arranged in an array in the fourth terminal accommodating recess portion 16d. The first terminal accommodating recess portion 16a is formed on the rear side, the second terminal accommodating recess portion 16b is formed on the front side of the first terminal accommodating recess portion 16a, the third terminal accommodating recess portion 16c is formed on the front side of the second terminal accommodating recess portion 16b, and the fourth terminal accommodating recess portion 16d is formed on the front side of the third terminal accommodating recess portion 16c. In the illustrated example, the first terminal accommodating recess portion 16a through the fourth terminal accommodating recess portion 16d are formed as respective openings, which are produced to extend through the bottom wall portion 12, but do not necessarily extend through bottom wall portion 12 and may be recessed portions with bottoms.

Each of the first terminals 51a is a connecting terminal for the first card 101a, each of the second terminals 51b is a connecting terminal for the second card 101b, each of the third terminals 51c is a connecting terminal for a third card 101c and each of the fourth terminals 51d is a connecting terminal for the fourth card 101d. As with the terminals of the first embodiment, each of the terminals is formed of sheet metal material having appropriate spring characteristic such as a metallic plate, and is formed into a cantilever-like form, so that a distal end portion 54a, 54b, 54c, 54d thereof is attached to its respective terminal attaching portion 14a, 14b, 14c, 14d of the bottom wall portion 12. More specifically, the distal end portion 54a of each of the first terminals 51a is held by the first terminal attaching portion 14a. The distal end portion 54b of each of the second terminals 51b is held by the second terminal attaching portion 14b. As the other aspects of the first and second terminals 51a, 51b are similar to the first embodiment 1, the description thereof will be omitted here.

The distal end portion of each of the third terminals 51c is a contact portion 53c extending obliquely in an upward direction towards a rear side direction within the third terminal accommodating recess portion 16c and projecting in an upward direction above an upper surface of the bottom wall portion 12. The contact portion 53c is configured to elastically contact each of contact pads 151c, which are arranged on a first surface 118c of the third card 101c. Further, a solder tail portion 52c extends in an opposite direction of the contact portion 53c from the distal end portion of each of the third terminals 51c and projects from a front-side edge of the third terminal attaching portion 14c towards the front. Each solder tail 52c is electrically connected to a signal line, a contact pad, a terminal, or the like formed on a circuit member or board or the like of an electronic device by means of soldering or the like.

The distal end portion of each of the fourth terminals 51d is a contact portion 53d extending obliquely in an upward direction towards the rear side direction in the fourth terminal accommodating recess portion 16d and projecting in an upward direction above the upper surface of the bottom wall portion 12. The contact portion 53d is configured to elastically contact each contact pad 151d which is arranged on a first surface 118d of the fourth card 101d as a terminal member. Further, a solder tail portion 52d extends in an opposite direction of the contact portion 53d from the distal end portion of each of the fourth terminals 51d and projects from a front side edge of the fourth terminal attaching portion 14d towards the front. Each solder tail 52d is electrically connected to a signal line, a contact pad, a terminal, or the like formed on a circuit member or board or the like of an electronic device by means of soldering or the like.

On an upper surface of the housing 11, a first card accommodating cavity portion 22a is defined at the rearmost position, a second card accommodating cavity portion 22b is defined on the front side of the first card accommodating cavity portion 22a, a third card accommodating cavity portion 22c is defined on the front side of the second card accommodating cavity portion 22b, and a fourth card accommodating cavity portion 22d is defined on the front side of the third card accommodating cavity portion 22c. A face located on the front side of the fourth card accommodating cavity portion 22d remains open. Further, an upper face of each of the first card accommodating cavity portion 22a through the fourth card accommodating cavity portion 22d also remains open.

The first card accommodating cavity portion 22a has a dimension in a width direction thereof which is smaller than the dimension in a width direction of a portion of the first card 101a near the rear end thereof and a dimension in a width direction of the second card 101b, and is where a portion of the first card 101a near the front end thereof is to be exclusively accommodated. Further, the second card accommodating cavity portion 22b has a dimension in a width direction thereof, which is larger than the dimension in the width direction of the first card accommodating cavity portion 22a, and is provided as a cavity portion in which both the first card 101a and the second card 101b may be accommodated. Furthermore, the third card accommodating cavity portion 22c has a dimension in a width direction which is larger than the dimension in the width direction of the second card accommodating cavity portion 22b, and is provided as a cavity portion in which both the first card 101a and the second card 101b, as well as a portion of the third card 101c near the front end thereof may be accommodated. The fourth card accommodating cavity portion 22d has a dimension in a width direction which is larger than the dimension in the width direction of the third card accommodating cavity portion 22c, and is provided as a cavity portion in which the second card 101b, the third card 101c, and the fourth card 101d may be accommodated.

In the top plate portion 62, an end positioning projection 64, a pair of first card side face holding projections 65a, a pair of second card side face holding projections 65b, a pair of third card side face holding projections 65c, and a pair of fourth card side face holding projections 65d are all integrally formed on an inner surface thereof which is the surface facing a bottom surface of the housing when shell 61 is at a closed position thereof. In the illustrated example, the end positioning projection 64, the first card side face holding projections 65a through the fourth card side face holding projections 65d are formed by stamping and forming the metal shell to lift and bend several portions of the top plate portion 62 to project from the top plate portion 62 at a right angle thereto.

Similarly to the aforementioned first embodiment, the end positioning projection 64 contacts a front end face 116a of the first card 101a, and performs positioning of the first card 101a held by the shell 61 in the front and rear direction. The first card side face holding projections 65a are dimensioned to engage left and right side face portions 117a of the first card 101a near the front end thereof and perform positioning of the first card 101a held by the shell 61 in the width direction. The distance between the first card side face holding projections 65a on the left and right sides is set to be either equal to or slightly larger than the width of a portion of the first card 101a near the front end thereof, and narrower than the width of the second card 101b.

Since end portions of the first card side face holding projections 65a engage the first surface 118a of the first card 101a, while the shell 61 is being moved to change the attitude thereof from an opened position thereof to the closed position thereof, the first card 101a is maintained in a state where the first card 101a is held in the shell 61 by the first card side face holding projections 65a. Front side ends 66 of the first card side face holding projections 65a contact front end face 116b of the second card 101b and perform positioning of the second card 101b held by the shell 61 in the front and rear direction as with the first embodiment.

As with the foregoing first embodiment, the second card side face holding projections 65b are formed, positioned and operate in a similar manner to such first embodiment. The distance between the second card side face holding projections 65b on the left and right sides is either equal to or slightly larger than the width of the second card 101b, and is designed to be larger than the width of the first card 101a and smaller than the width of the third card 101c. Front side ends 66 of the second card side face holding projections 65b contact front end face 116c of the third card 101c and determine the front to rear position of the third card 101c held by the shell 61.

As with the first and second card side face holding projections 65a, 65b, the third card side face holding projections 65c are formed on the top plate portion 62 on the front side of the second card side face holding projections 65b, and are engaged with the left and right side face portions 117c of the third card 101c near the front end thereof and position in the width direction the third card 101c held by the shell 61. The distance between the third card side face holding projections 65c on the left and right sides is either equal to or slightly larger than the width of a portion of the third card 101c located to the front side, and is designed to be larger than the width of the second card 101b and smaller than the width of the fourth card 101d.

End portions of the third card side face holding projections 65c are bent so as to be approximately parallel to the top plate portion 62, and engage the first surface 118c of the third card 101c. Therefore, while the shell 61 is being moved from the open position thereof to the closed position, the third card 101c is held in place by the shell 61. Further, front side ends 66 of the third card side face holding projections 65c contact front end surface 116d of the fourth card 101d and perform the front to rear positioning of the fourth card 101d held by the shell 61.

The fourth card side face holding projections 65d are formed in the top plate portion 62 on the front side of the third card side face holding projections 65c, and engage the left and right side face portions 117d of the fourth card 101d to position the fourth card 101d in the width direction. The distance between the fourth card side face holding projections 65d on the left and right sides is either equal to or slightly larger than the width of the fourth card 101d, and is designed to be larger than the width of the third card 101c.

The end portions of the fourth card side face holding projections 65d are bent to be approximately parallel to the top plate portion 62, and engage the first surface 118d of the fourth card 101d. Hence, while the shell 61 is being moved from the open position to the closed position thereof, the fourth card 101d is securely maintained in the shell 61. The remaining constitutions and constructions are//similar to those in the first embodiment, and therefore the descriptions thereof are omitted here.

Figure 19:
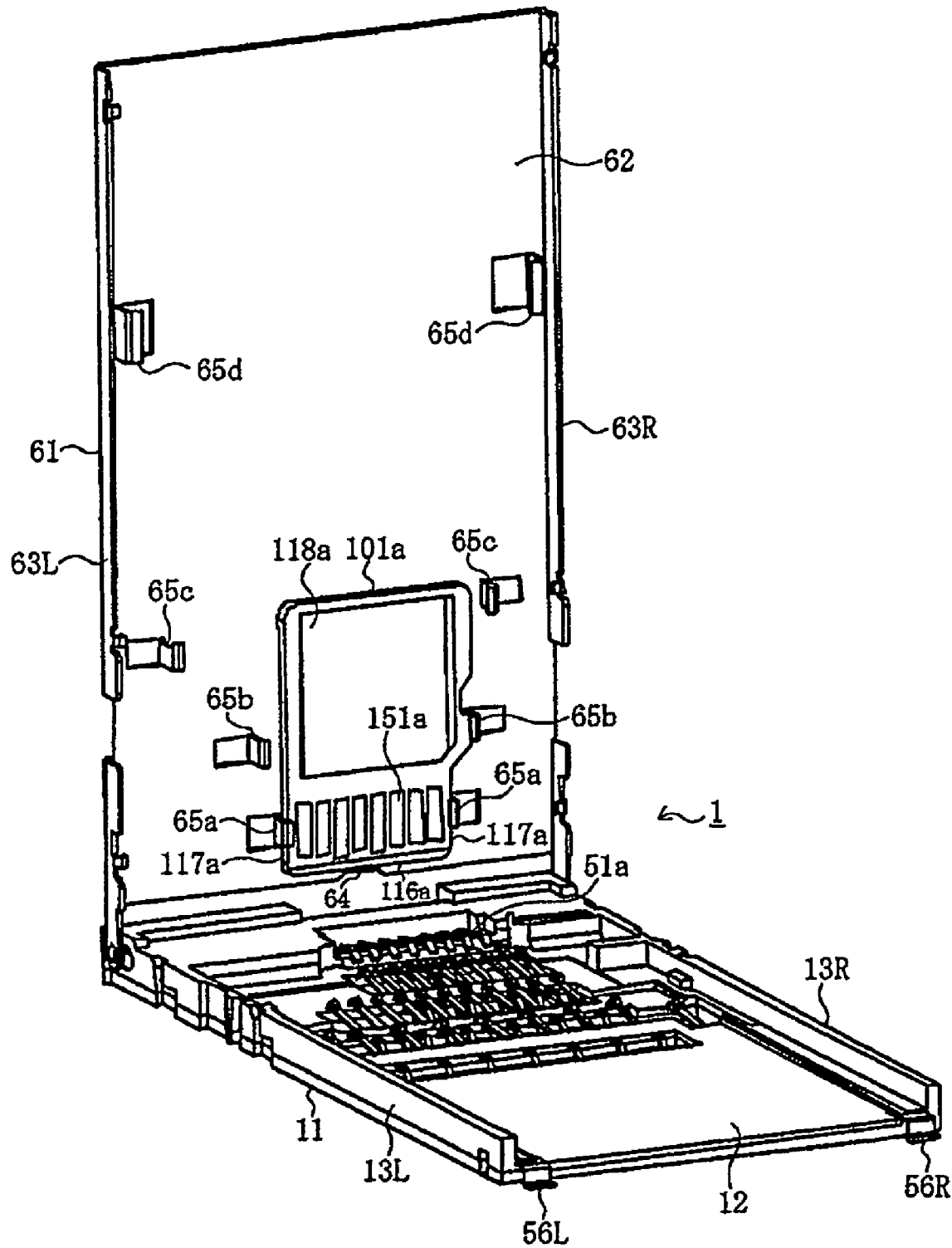
FIG. 19 is a perspective view similar to FIG. 15 but with a first card inserted in the shell of the card connector.

Referring to FIGS. 19-22, the card connector of the second embodiment is shown with the shell 61 at the open position and with different cards inserted therein. More specifically, FIG. 19 shows the first card 101a retained in shell 61 with the front end face 116a engaging end positioning projection 64 to position the card 101a in a front to back direction and the side face portions 117a engaging the first card side face holding projections 65a to position card 101a in the width direction.

Figure 20:
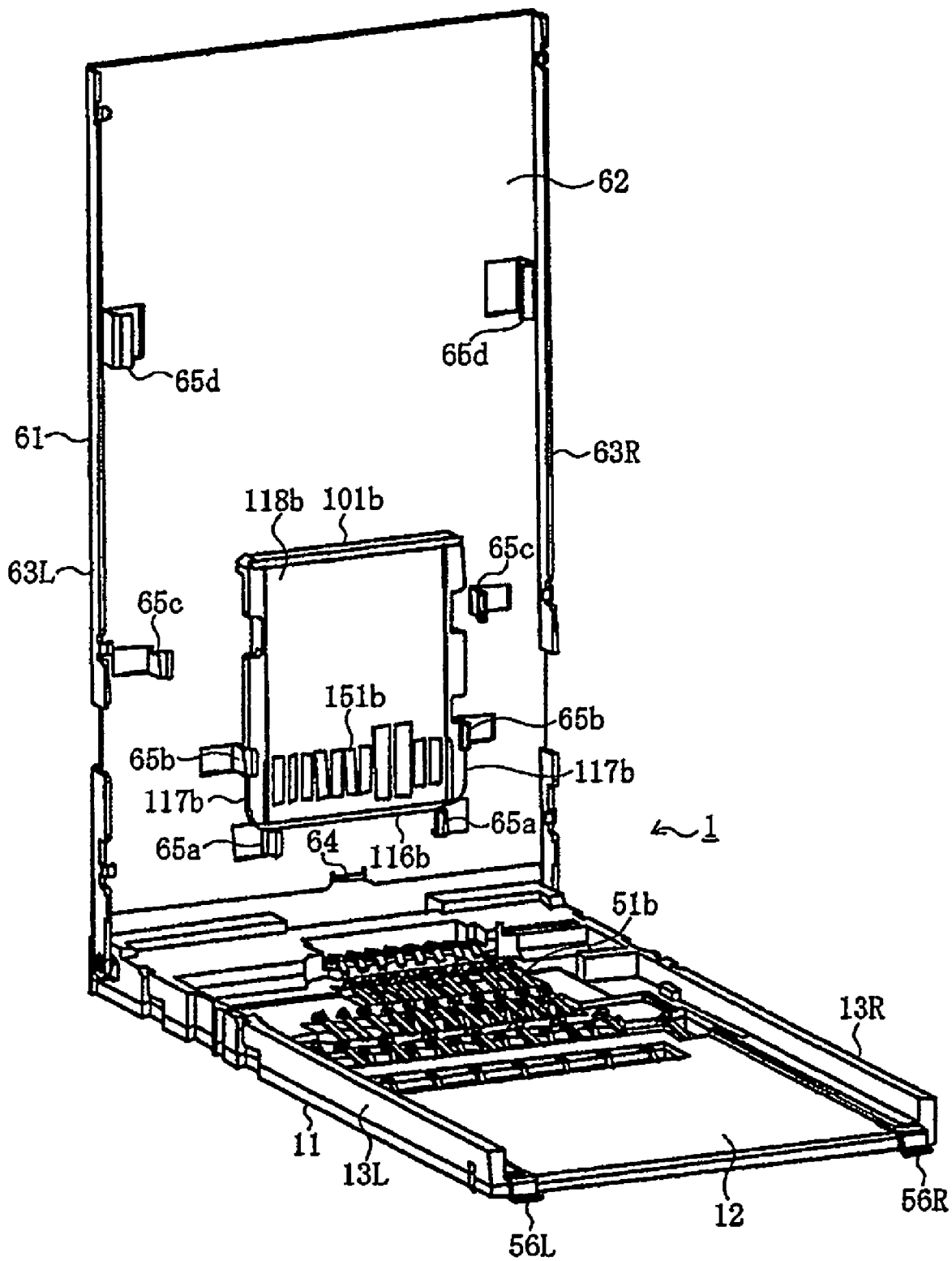
FIG. 20 is a perspective view similar to FIG. 15 but with a second card inserted in the shell of the card connector.

FIG. 20 shows the second card 101b retained in shell 61 with the front end face 116b thereof engaging first card side face holding projections 65a to position the card 101b in a front to back direction and the side face portions 117b engaging the second card side face holding projections 65b to position second card 101b in the width direction.

Figure 21:
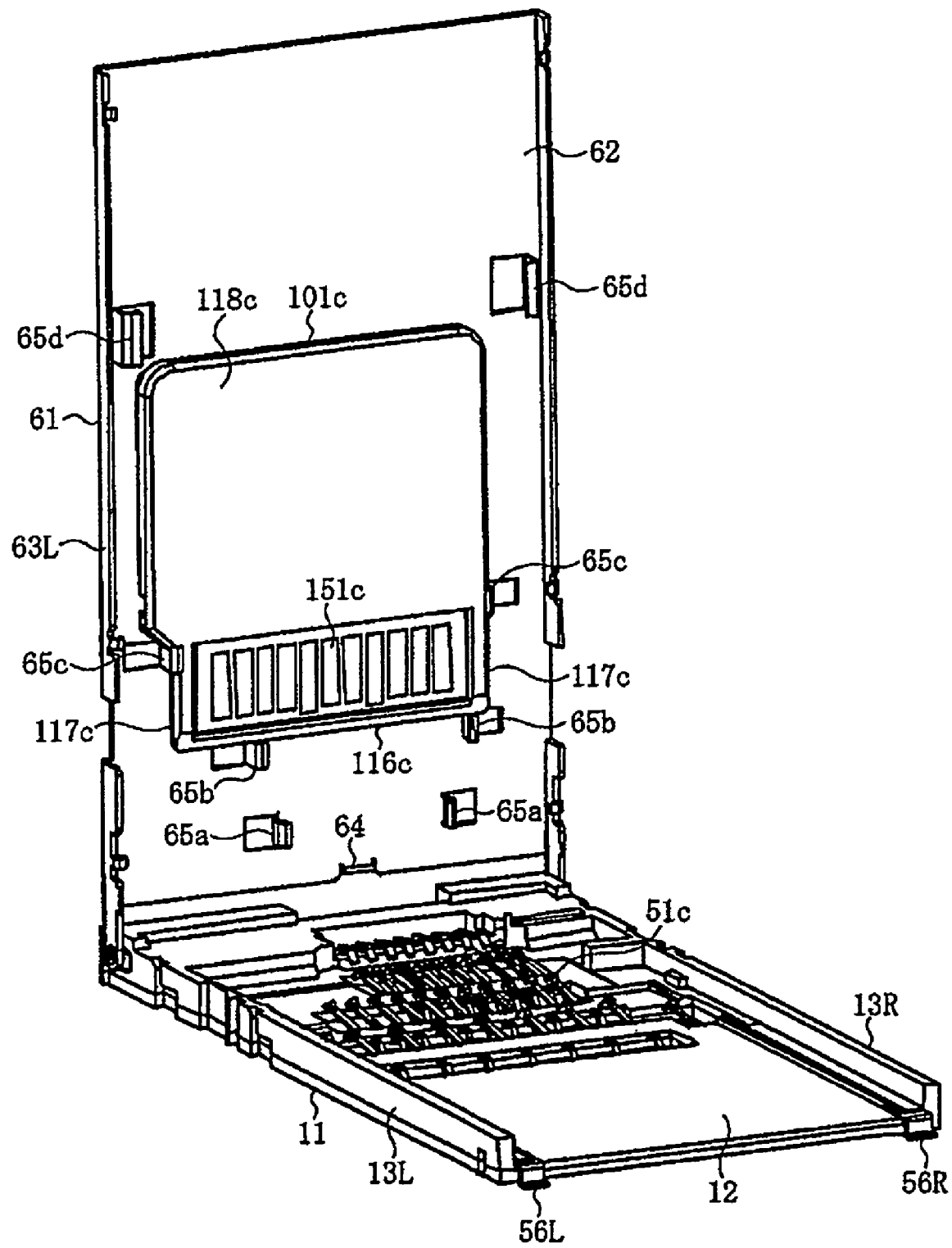
FIG. 21 is a perspective view similar to FIG. 15 but with a third card inserted in the shell of the card connector.

Similarly, FIG. 21 shows the third card 101c retained in shell 61 with the front end face 116c thereof engaging second card side face holding projections 65b to position the third card 101c in a front to back direction and the side face portions 117c engaging the third card side face holding projections 65c to position third card 101c in the width direction.

Figure 22:
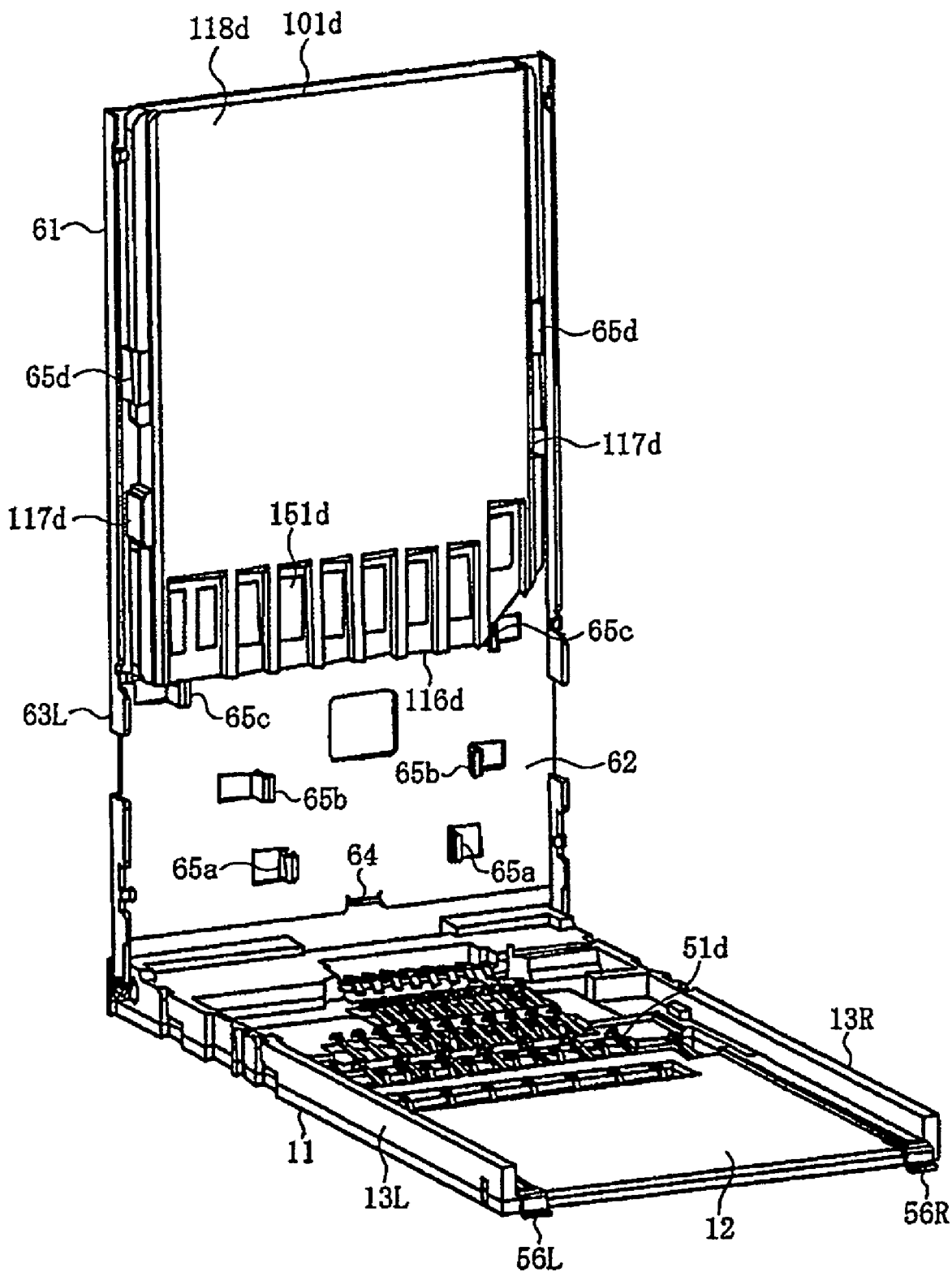
FIG. 22 is a perspective view similar to FIG. 15 but with a fourth card inserted in the shell of the card connector.
Figure 23:
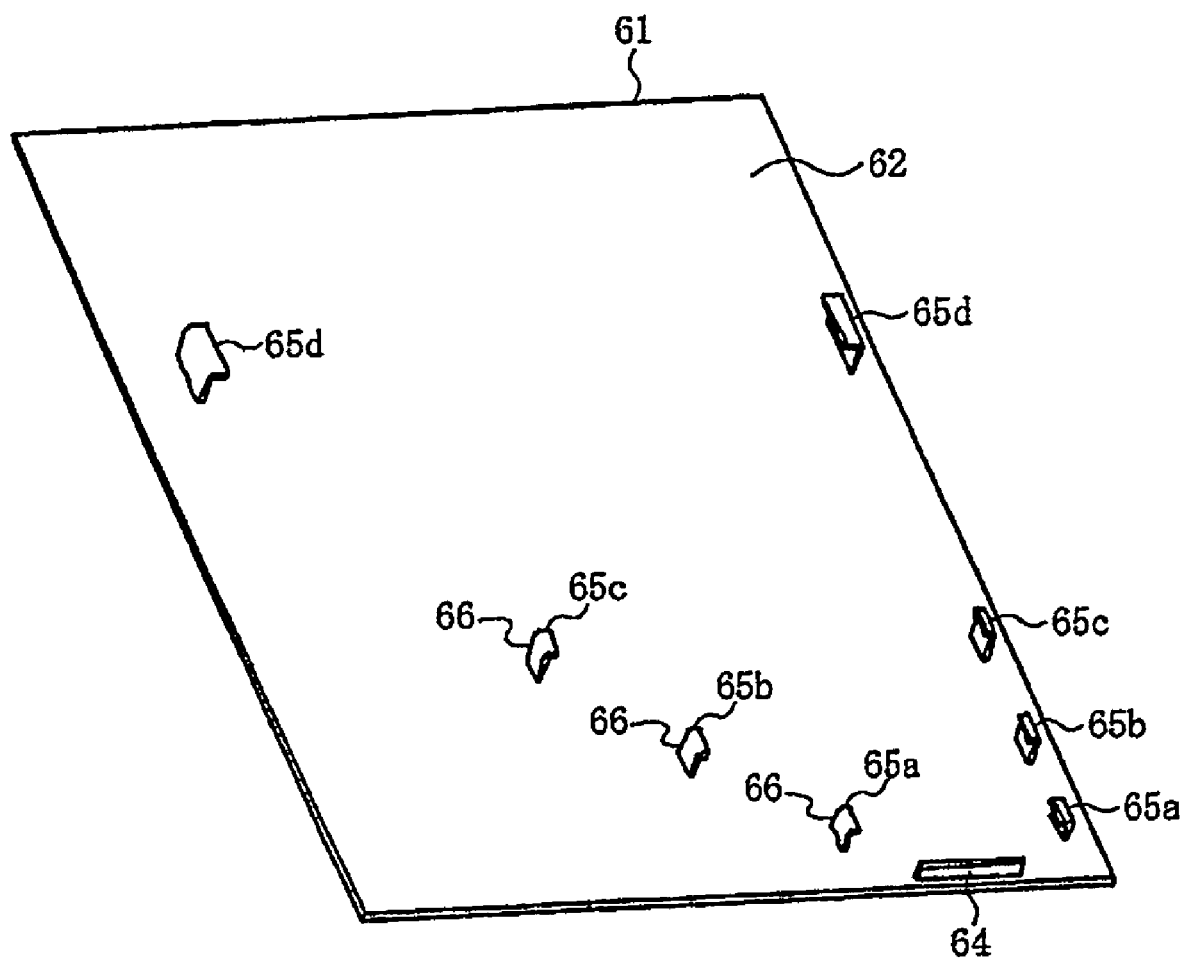
FIG. 23 is a somewhat schematic perspective view illustrating portions of a shell of a card connector according to a third embodiment of the present invention.
Figure 24:
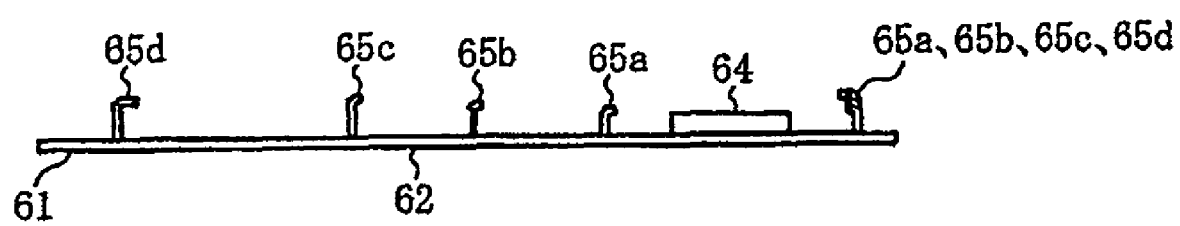
FIG. 24 is a side view illustrating the shell of FIG. 23.
Figure 25:
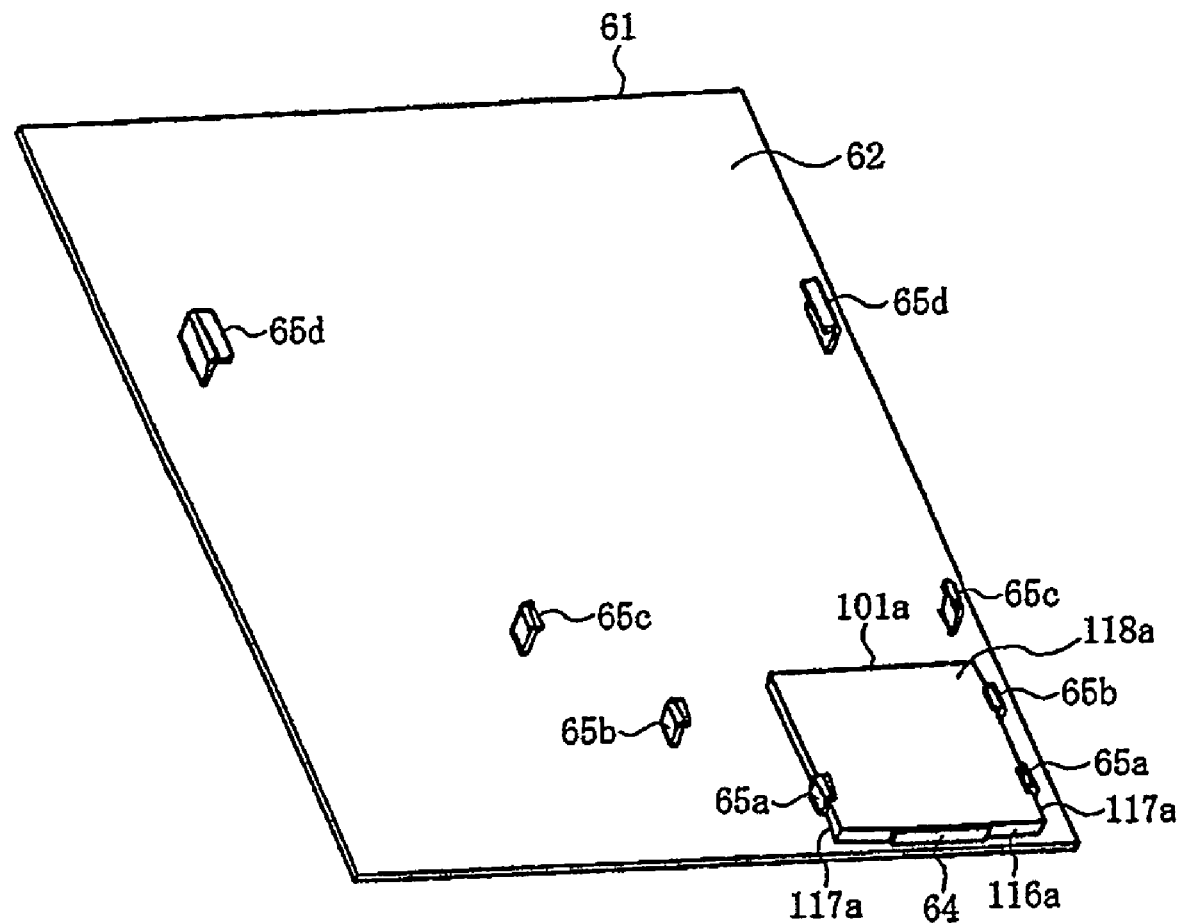
FIG. 25 is a perspective view similar to that of FIG. 23 but with a first card inserted in the shell.
Figure 26:
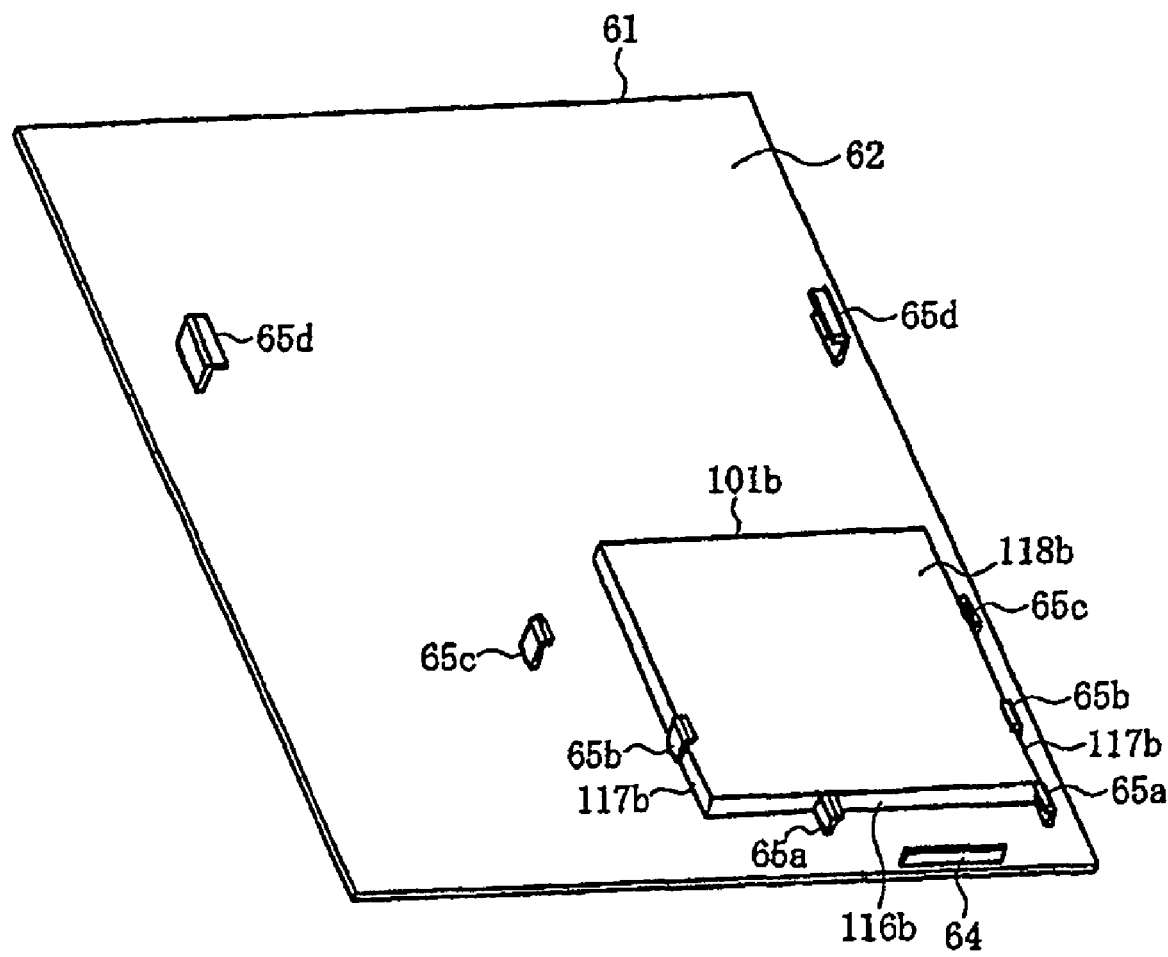
FIG. 26 is a perspective view similar to that of FIG. 23 but with a second card inserted in the shell.
Figure 27:
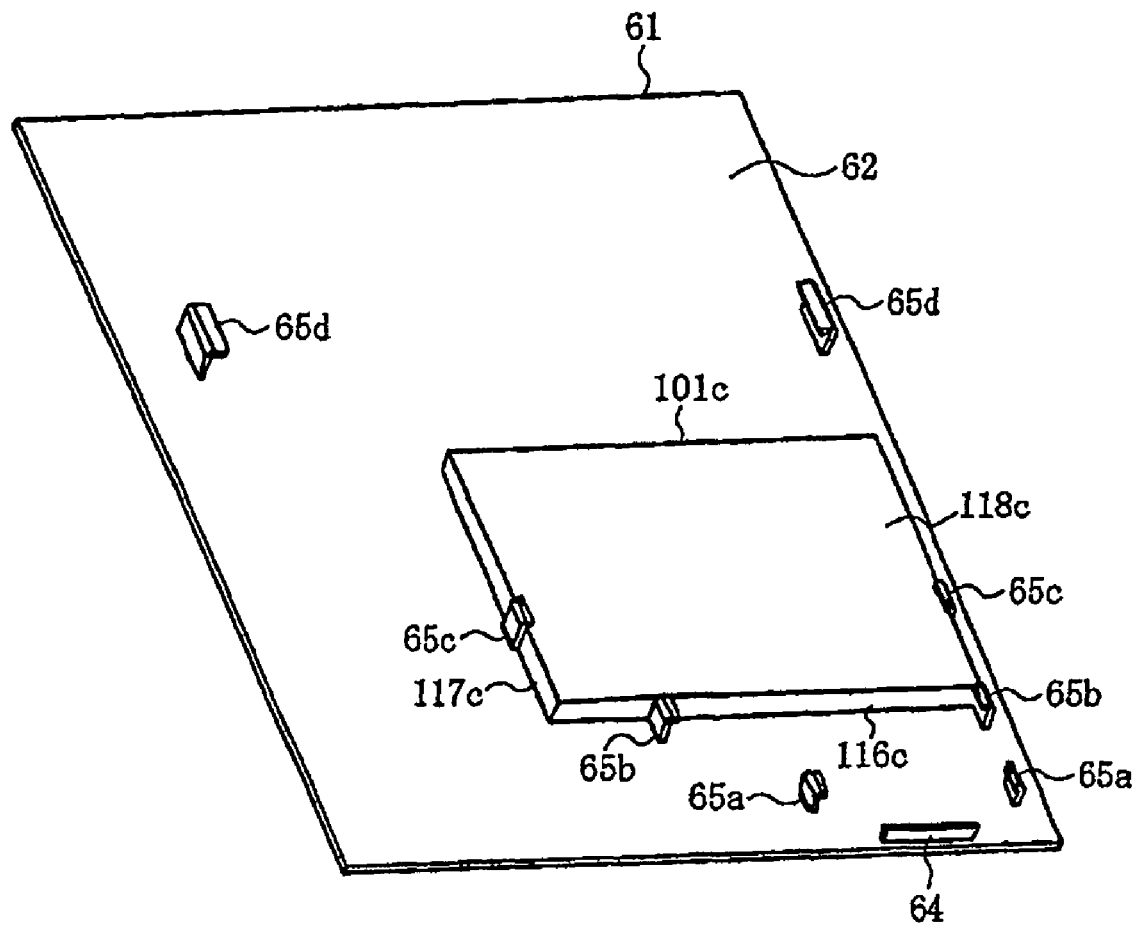
FIG. 27 is a perspective view similar to that of FIG. 23 but with a third card inserted in the shell.
Figure 28:
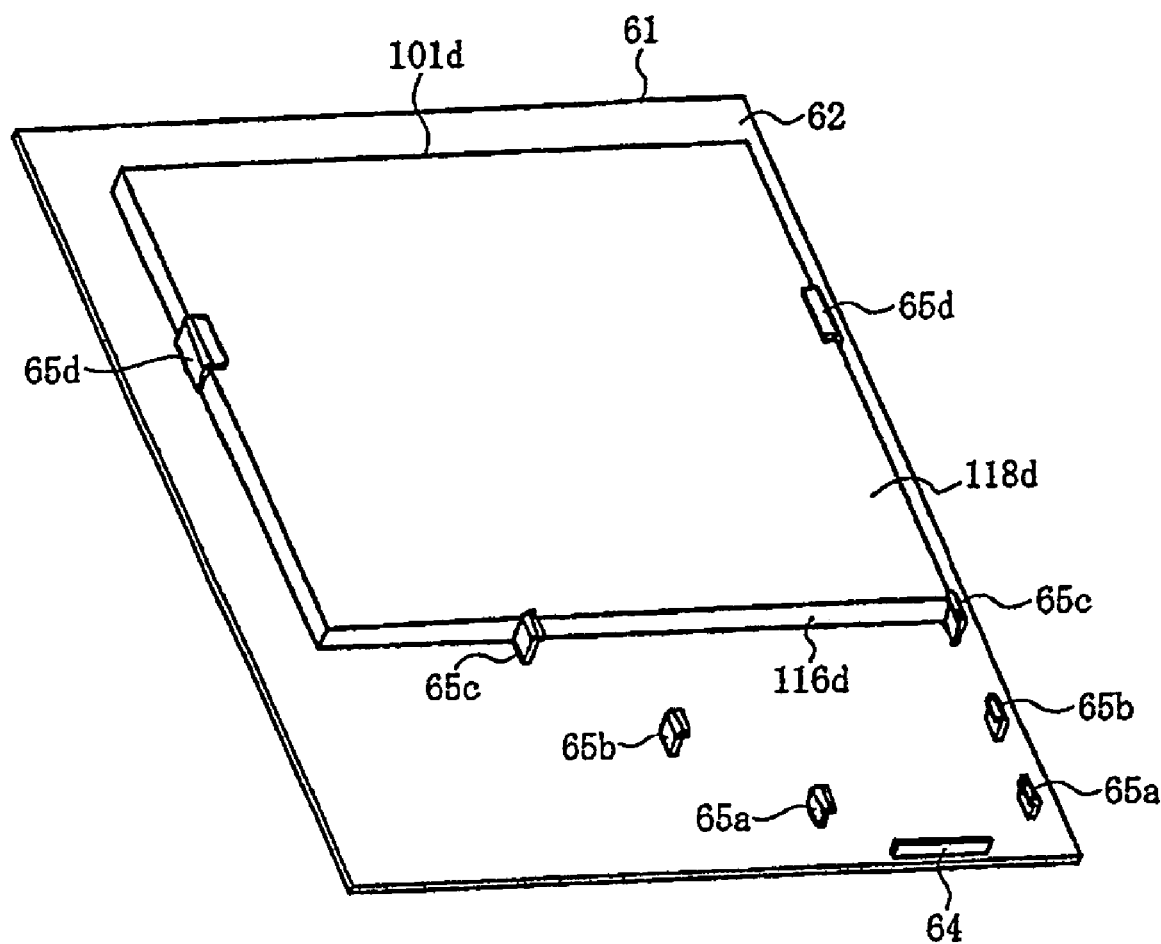
FIG. 28 is a perspective view similar to that of FIG. 23 but with a fourth card inserted in the shell.
Figure 29:
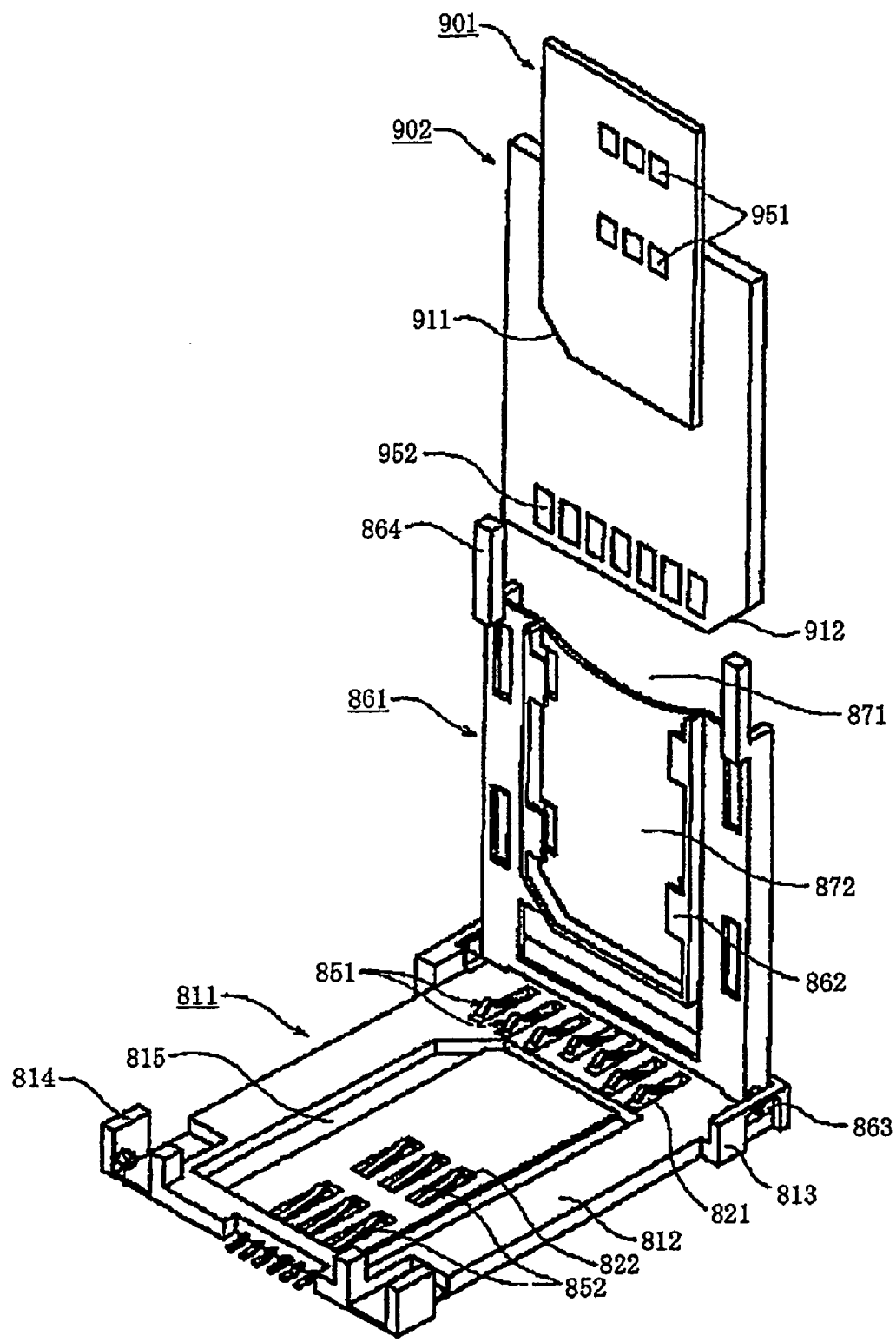
FIG. 29 is a perspective view of a card connector according to the prior art.

Finally, FIG. 22 shows the fourth card 101d retained in shell 61 with the front end face 116d thereof engaging third card side face holding projections 65c to position the fourth card 101d in a front to back direction and the side face portions 117d engaging the fourth card side face holding projections 65d to position fourth card 101d in the width direction.

Except with respect to their end location and the resultant alignment with different card side face holding projections and terminals, each of the cards 101a-d is inserted in same manner as described above with respect to the first embodiment and such description is not repeated herein. The procedure used by the user to rotate and move the shell 61 downward about rotating spindles 68 and into the closed or operative position is identical to that described with respect to the first embodiment and is also not repeated herein.

As described above, in this embodiment, since any one of the four cards (first card 101a though the fourth card 101d) may be exclusively mounted in the shell 61, each of the first card 101a through the fourth card 101d may be accommodated in the corresponding location within the cavity portion of the housing 11 and is electrically connected to the corresponding terminals, in other words, the appropriate ones of the first terminals 51a though the fourth terminals 51d.

The shell 61 is provided with "n" types of card side face holding projections, in other words, the first card side face holding projections 65a through the fourth card side face holding projections 65d as card positioning members, and each of the side face portions of the cards engages the corresponding card side face holding projections to align the card in the width direction. This means that, since only "n"th type of card has left and right side face portions thereof which can be engaged with the "n"th type of card side face holding projections on the left and right sides, each card can be discriminated with certainty by engaging the side face portions thereof with the corresponding card side face holding portions.

In other words, the width of "n"th type of card is larger than that of "n−1"th type of card and smaller than that of "n+1"th type of card. At the same time, the distance between "n"th type of card side face holding projections on the left and right sides is larger than the width of "n−1"th type of card and is smaller than the width of the "n+1"th type of card, and therefore, each type of card is automatically discriminated by its engagement with the card side face holding projections and is accommodated in only one specific location corresponding to the type of the card within the cavity portion of the housing 11.

Also, "n"th type of card side face holding projections on the left and right sides serve as insertion or end positioning members for "n+1"th type of card. Through this structure, the card positioning members provided on the shell 61 serve dual purposes (i.e., align the "n"th card in the width direction and align the "n+1"th card in the front to rear or insertion direction) so that the number of card positioning members may be reduced, thus simplifying the structure of the shell 61.

Referring to FIGS. 23-38, a somewhat schematic view of the shell 61 of a third embodiment of the present invention is shown and only includes the card side face holding projection and the end positioning projection. Such shell 61 is very similar to that of the second embodiment and is also configured to receive any of four different sized cards therein at any one time. Those elements having the same structures and arrangements as those in the second embodiment are designated by the same reference numerals and descriptions thereof are omitted. Description of the same operations and effects as those in the second embodiment are also be omitted for simplicity.

In the third embodiment, first card side face holding projection 65*a* through fourth card side face holding projections 65*d* on either the left or right side of shell 61 are arrayed along a straight line extending in the front and rear direction of a shell 61. In the illustrated example, the card side face holding projections on the right side are arrayed along the straight line adjacent the right side edge of the shell 61. The end positioning projection 64 is provided at a position corresponding to a position located between the paired first card side face holding projections 65*a*.

Comparing FIGS. 25-28 to FIGS. 19-22, it can be seen that the cards are retained in an identical manner in the third embodiment compared to the second embodiment but with the cards aligned adjacent the right side of shell 61 in the third embodiment. More specifically, the first card 101*a* is retained between first card side holding projections 65*a* and insertion is stopped by end positioning projection 64. Second card 101*b* is retained between second card side holding projections 65*b* and insertion is stopped by first card side holding projections 65*a*. Similarly, third card 101*c* is retained between third card side holding projections 65*c* and insertion is stopped by second card side holding projections 65*b*. Finally, fourth card 101*d* is retained between fourth card side holding projections 65*d* and insertion is stopped by third card side holding projections 65*c*. It should be noted that it may be desirable to slightly offset the position of the card side holding projections along the right side so that the first, second and third card side holding projections 65*a-c* each sufficiently projects into the path of the "n+1"th card so as to stop the card in the insertion direction. The rest of the aspects of the structure and operation are similar to those of the second embodiment, and therefore the descriptions thereof are omitted.

As described above, in this embodiment, the first card side face holding projection 65*a* through the fourth card side face holding projection 65*d* on either the left or right side are arrayed along a straight line extending in the front and rear direction of the shell 61. In addition, the width of "n"th type of card is larger than that of "n−1"th type of card and smaller than that of "n+1"th type of card, and a distance between "n"th card side face holding projections on left and right sides is larger than the width of "n−1"th type of card and smaller than the width of "n+1"th type of card.

Further, "n"th card side face holding projections on the left and right sides serve as front end positioning members for "n+1"th type of card. Hence, the number of card positioning members provided in the shell 61 can be reduced, thus simplifying the structure of the shell 61. If desired, the first card side face holding projection 65*a* through the fourth card side face holding projections 65*d* on one side may be formed into a side face holding portion for a plurality of types of cards, which is formed of a single continuous plate-like member. In such case, when a card is inserted by maintaining sliding contact with the side face holding projection for the plurality of types of cards, the card can be easily and surely inserted without aligning the card to an insertion position.

The rest of the effects are similar to the foregoing first and second embodiments, and the descriptions thereof are thus omitted.

The present invention is not limited to the above-described preferred embodiments, and may be changed in various ways based on the gist of the present invention, and these changes are not eliminated from the scope and spirit of the present invention defined by the appended claims.

What is claimed is:

1. A card connector adapted to receive first and second electronic cards, said first card having a plurality of first contact pads and a first width and said second card having a plurality of second contact pads and a second width, the second width being greater than the first width, said connector comprising:

an insulative housing a plurality of first terminals and plurality of second terminals mounted on said housing, said first terminals being configured to contact respective ones of the first contact pads when said first card is inserted into said card connector, said second terminals being configured to contact respective ones of the second contact pads when said second card is inserted into said card connector, said plurality of first terminals being spaced from said plurality of second terminals;

a cover member pivotally mounted on said housing to permit movement of the cover member between an open position at which one of said first and second electronic cards may be inserted into said cover and a closed position at which the electronic card inserted into said cover is operatively positioned within said card connector and the contact pads of said one of the first and second electronic cards engages corresponding ones of said first and second plurality of terminals, the cover member having a first set of positioning members configured to position and hold of the first electronic card exclusively at a first given location for such card and a second set of positioning members configured to position and hold of the second electronic card exclusively at a second given location for such card, and some of the positioning members of the first set also being positioning members of the second set of positioning members.

2. The card connector according to claim 1, wherein the given location of each type of card is positioned so that the first given location is closer to one end of the cover member, and the second given location is closer to an opposite end of the cover member.

3. The card connector according to claim 1, wherein a portion of the first given location overlaps with a portion of the second given location.

4. The card connector according to claim 1, wherein each set of positioning members include side face positioning members configured to engage outer edge surfaces of the electronic cards to position each respective card in the width direction thereof.

5. The card connector according to claim 4, wherein a side face positioning member of said first set acts as an end positioning member for said second electronic card to position said electronic card in an insertion direction.

6. The card connector according to claim 3, wherein the side face positioning members are further provided such that each of the side face positioning members includes positioning members configured to form a pair and are disposed at positions corresponding to left and right opposite sides of one of the cards, and a distance between the positioning members on left and right sides corresponding to "n"th type of card is larger than a width of "n−1"th type of card and smaller than a width of "n+1"th type of card where "n" represents a natural number.

7. The card connector according to claim 6, wherein the side face positioning members corresponding to the "n"th type of card comes into contact with a front end face to of the "n+1" type of card to thereby perform positioning of the said latter card in a front and rear direction thereof.

8. The card connector according to claim 6, wherein the side face positioning members are further provided such that respective ones of the respective paired positioning members thereof disposed at positions corresponding to either left or right side of the cards are arrayed along a straight line extending in the front and rear direction of the cover member.

9. The card connector according to claim 3, wherein the positioning members comprises a front end positioning member configured to come into contact with a front end face of a first type of card to thereby perform positioning of the said first type of card in the front and rear direction thereof.

* * * * *